(12) United States Patent
Lavrisa et al.

(10) Patent No.: US 12,019,347 B2
(45) Date of Patent: Jun. 25, 2024

(54) ELECTROPHORETIC DISPLAY ASSEMBLIES AND DEVICES AND METHODS OF MANUFACTURE THEREOF

(71) Applicant: HALION DISPLAYS INC., Kitchener (CA)

(72) Inventors: Matthew Thomas Lavrisa, Ottawa (CA); Ryan Phillip Marchewka, Kitchener (CA); Bo Cui, Kitchener (CA); Ripon Kumar Dey, Kitchener (CA)

(73) Assignee: HALION DISPLAYS INC., Kitchener (CA)

( * ) Notice: Subject to any disclaimer, the term of this patent is extended or adjusted under 35 U.S.C. 154(b) by 206 days.

(21) Appl. No.: 17/434,355

(22) PCT Filed: Feb. 27, 2020

(86) PCT No.: PCT/IB2020/051686
§ 371 (c)(1),
(2) Date: Aug. 26, 2021

(87) PCT Pub. No.: WO2020/174437
PCT Pub. Date: Sep. 3, 2020

(65) Prior Publication Data
US 2022/0163863 A1     May 26, 2022

Related U.S. Application Data

(60) Provisional application No. 62/814,420, filed on Mar. 6, 2019, provisional application No. 62/811,139, filed on Feb. 27, 2019.

(51) Int. Cl.
*G09G 5/00*    (2006.01)
*G02F 1/167*   (2019.01)
(Continued)

(52) U.S. Cl.
CPC ............ *G02F 1/167* (2013.01); *G02F 1/1676* (2019.01); *G02F 1/1681* (2019.01); *G02F 2001/1678* (2013.01)

(58) Field of Classification Search
CPC .... G02F 1/167; G02F 1/1676; G02F 1/16761; G02F 1/1681; G02F 2001/1678
See application file for complete search history.

(56) References Cited

U.S. PATENT DOCUMENTS 5,077,157 A     12/1991   DiSanto et al.
6,631,022 B1 *  10/2003   Kihira .................... H04N 23/75
                                                   348/E5.04

(Continued)

FOREIGN PATENT DOCUMENTS

JP       2013152260 A      8/2013
TW       201441750 A      11/2014
WO   WO-2013024735 A1     2/2013

OTHER PUBLICATIONS

ISA/CA, International Search Report and Written Opinion, dated May 28, 2020 re PCT International Patent Application No. PCT/IB2020/051686.

*Primary Examiner* — Insa Sadio
(74) *Attorney, Agent, or Firm* — Perry + Currier Inc.

(57) ABSTRACT

An example electrophoretic display assembly includes: an outer substrate; an inner substrate; a first electrode and a second electrode disposed between the inner substrate and the outer substrate in a spaced apart relationship; and at least one substantially planar microstructure between the first and second electrodes, the microstructure containing an electrophoretic media. For example, the planar microstructures may be parallel to or perpendicular to the outer substrate. Also provided are example methods of fabricating electrophoretic display assemblies. A plurality of electrophoretic display assemblies may be combined to form an electropho- (Continued)

retic display, wherein each display assembly represents a pixel of the display device. The planar microstructures may increase the display quality, including the contrast or color capabilities of electrophoretic displays.

31 Claims, 26 Drawing Sheets

(51) Int. Cl.
*G02F 1/1676* (2019.01)
*G02F 1/1681* (2019.01)
G02F 1/1675 (2019.01)

(56) References Cited

U.S. PATENT DOCUMENTS

| | | |
|---|---|---|
| 2006/0203179 A1 | 9/2006 | Kawase |
| 2006/0273348 A1 | 12/2006 | Yoshinaga et al. |
| 2009/0122390 A1 | 5/2009 | Liang et al. |
| 2011/0157681 A1 | 6/2011 | Kwon et al. |
| 2012/0019895 A1 | 1/2012 | Shin et al. |
| 2012/0314274 A1 | 12/2012 | Komatsu et al. |
| 2014/0376081 A1* | 12/2014 | Yokokawa .............. G02F 1/167 |
| | | 359/296 |
| 2016/0246066 A1 | 8/2016 | Zhang et al. |
| 2017/0121563 A1 | 5/2017 | Moran |

\* cited by examiner

ELECTROPHORETIC DISPLAY ASSEMBLIES AND DEVICES AND METHODS OF MANUFACTURE THEREOF

FIELD

The specification relates generally to display panel technologies, and more particularly to electrophoretic display apparatuses and methods of manufacture thereof.

BACKGROUND

Various technologies are employed in the manufacture of display panels. Some, e.g. liquid crystal and electrowetting displays, suffer from optical losses, leading to inefficient use of backlight. Others, such as electrochromic displays, suffer from slow response times and increased voltage requirements to drive pixels compared to LCD and electrowetting displays.

SUMMARY

According to an aspect of the present specification, an electrophoretic display assembly is provided. The display assembly includes an outer substrate; an inner substrate; a first electrode and a second electrode disposed between the inner substrate and the outer substrate in a spaced apart relationship; and at least one substantially planar microstructure between the first and second electrodes, the microstructure containing an electrophoretic media.

According to another aspect of the present specification, a method of fabricating a display assembly is provided. The method includes: providing a substrate layer; applying a layer of preliminary material to the substrate layer; applying a mask material to the preliminary material; etching trenches in the preliminary material; applying a conformal coat of dielectric material; etching channels in the conformal coat; and filling the channels with an electrophoretic fluid.

According to another aspect of the present specification, another method of fabricating a display assembly is provided. The method includes: providing a substrate layer; applying a layer of preliminary material to the substrate layer; applying a mask material to the preliminary material; etching at least one channel in the preliminary material; applying a first electrode and a second electrode extending from the substrate in a spaced-apart relationship; and filling the at least one channel with an electrophoretic fluid.

According to another aspect of the present specification, another method of fabricating a display assembly is provided. The method includes: providing a substrate having an initial polymer sublayer on a surface thereof; applying a frozen electrophoretic sublayer onto the initial polymer sublayer; and applying a polymer sublayer on the electrophoretic sublayer.

BRIEF DESCRIPTION OF DRAWINGS

Implementations are described with reference to the following figures, in which.

DETAILED DESCRIPTION

The description below sets out certain structures and methods of manufacture for display assemblies employing electrophoretic media to control the color, contrast, and other visual attributes of the display assembly. A detailed discussion of the electrophoretic media is provided in PCT application no. PCT/IB2019/058306 filed Sep. 30, 2019, the contents of which is incorporated herein by reference.

In brief, in some embodiments, the electrophoretic media includes two sets of nanoparticles. The particles in the first set include a negatively charged core and a polymeric corona functionalized with an optically active component. The particles in the second set include a positively charged core and a polymeric corona functionalized with a further optically active component. The optically active components are selected to interact with one another when a positively charged nanoparticle is sufficiently close to a negatively charged nanoparticle. When the optically active components interact, they form a compound with different absorption characteristics than either component alone. For example, when separated the nanoparticles may be substantially transparent, and when physically close enough for the optically active components to interact the nanoparticles may transmit certain wavelengths of light (e.g. red) and absorb others.

Thus, by controlling electric fields applied to a fluid containing nanoparticles from both of the above-mentioned sets, the separation distance between the nanoparticles can be controlled, which affects how many of the nanoparticles interact and therefore the degree to which the optical characteristics of the fluid are altered. A variety of materials, as well as additional discussion on the behavior of such materials, are provided in the above-mentioned co-pending PCT application.

Figure 1A:
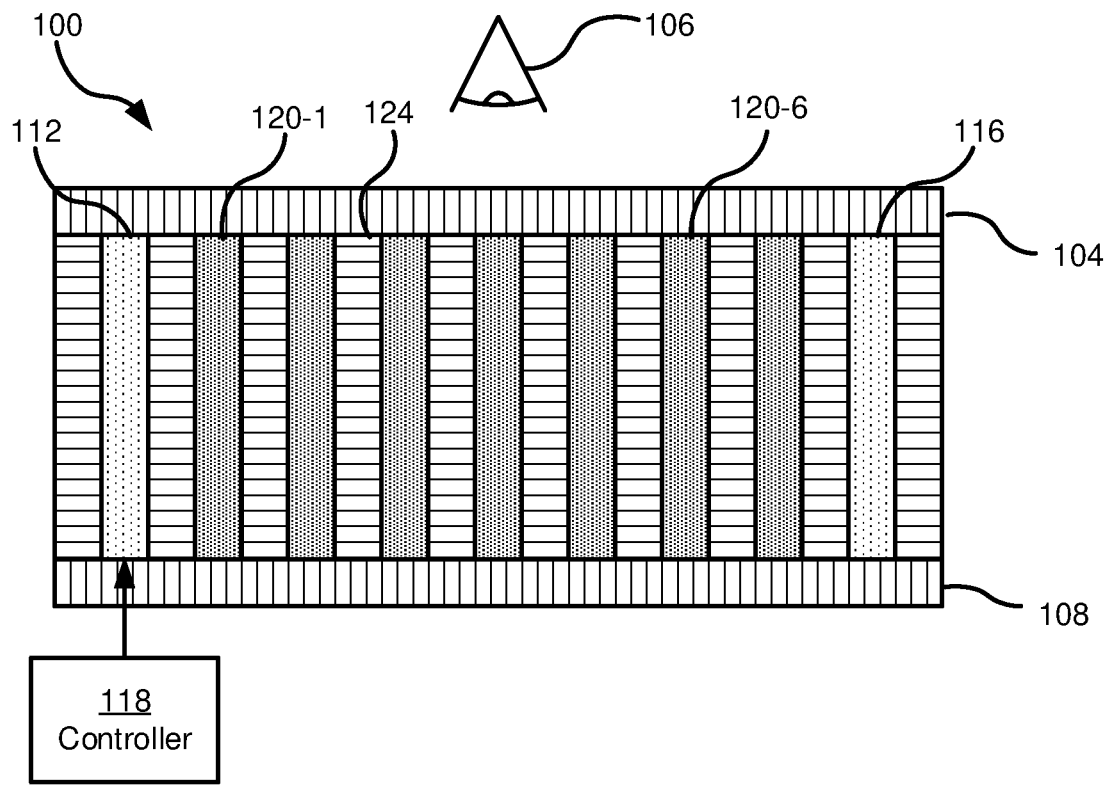
FIG. 1A depicts an example electrophoretic display assembly including a microstructure.

FIG. 1A depicts an example display assembly 100 employing the above-mentioned electrophoretic media mentioned above. The display assembly 100 (also referred to herein as simply assembly 100). The display assembly 100 includes an outer substrate 104 (e.g., glass or another suitable translucent or transparent material), referred to as "outer" due to its position away from the interior of an electronic device (not shown) supporting the display assembly 100 and towards a viewer (indicated by the symbol 106). The assembly 100 also includes an inner substrate 108, such as a reflective material; the inner substrate 108 can also be transparent or translucent in some embodiments. The substrates 104 and 108 are arranged substantially parallel to one another, and substantially perpendicular to the direction of viewing.

Between the inner and outer substrates 108 and 104, the assembly 100 includes a first electrode 112 and a second electrode 116. The electrodes are disposed in a spaced-apart relationship relative to each other. One of the electrodes 112 and 116 is driven by a controller 118 (e.g., connected to the internal electronics of a computing device such as a smartphone or the like), while the other of the electrodes 112 and 116 is a reference electrode. The electrodes 112 and 116 can be fabricated of an opaque conductive material such as doped silicon or silver, or a substantially transparent conductive material, such as silver nanowire or indium tin oxide (ITO). For example, the material of the electrodes 112 and 116 may be selected according to the orientation and spatial arrangement of the electrodes 112 and 116 relative to the viewing direction.

In some examples, the display assembly 100 may include further electrodes to provide more precise or better control in the assembly 100. That is, a single assembly 100 may include multiple driven electrodes and multiple reference electrodes. The multiple driven electrodes would be driven by the same controller 118 and use one driving signal to extend the electric field. Thus, the assembly 100 and its corresponding pixel may be expanded according to the size of the electric field covered by the multiple driven electrodes. For example, electrodes may be interdigitated in the assembly 100. In such examples, adjacent assemblies 100 may share their outermost reference electrodes.

Between the electrodes 112 and 116, the assembly 100 includes at least one substantially planar microstructure 120 (seven microstructures 120 are shown in the example of FIG. 1). Each microstructure 120 is substantially parallel to the electrodes 112 and 116 and contains an electrophoretic media containing the above-mentioned charged nanoparticles. The electrodes 112 and 116 are controllable by the controller 118, which applies voltage differences to the electrodes 112 and 116 to generate an electric field between the electrodes and perpendicular to the microstructures 120. As will be apparent, the electric field controls the separation between oppositely-charged nanoparticles in each microstructure 120 and therefore controls the absorption spectra (and thus the visual appearance) of the electrophoretic media in the microstructures 120.

The assembly 100 may further include dielectric dividers 124 disposed between adjacent microstructures 120. The dividers 124 separate the microstructures 120 and permit the assembly 100 to take advantage of Gauss' law, according to which the electric field in adjacent layers is similar. That is, when the oppositely charged particles in a first microstructure 120-1 separate under the influence of a given electric field applied by the electrodes 112 and 116, then the oppositely charged particles in adjacent microstructures (e.g., 120-2) will also separate. In comparison to a single electrophoretic structure with a thickness equal to the total thickness of the thirteen microstructures 120 shown in FIG. 1, the arrangement of FIG. 1 permits the generation of an electric field with a lower current requirement imposed on the electrodes 112 and 116.

Each microstructure 120 has a minimum width (i.e., the dimension perpendicular to the electrodes 112, 116) that is sufficient to accommodate two of the above-mentioned charged particles adjacent to one another without being in physical contact (i.e., to be sufficiently separated as to be in their non-interacting state). That is, the width of each microstructure 120 is at least twice the diameter of the charged particles. The width of each microstructure 120 is preferably between about 200 nm and about 20 µm. In some examples, the width of each microstructure 120 is between about 500 nm and 2 µm. In other examples, however, the width of one or more microstructures 120 may exceed 20 µm or be smaller than 200 nm. The microstructures 120 in a given assembly 100 need not have identical widths. In general, the greater the width of a microstructure 120, the greater the voltage required to drive the microstructure 120 (i.e., to change the absorption characteristics of the microstructure 120).

The dielectric dividers 124 cause voltage drops across their widths and are therefore limited in width; however, each divider 124 is also of sufficient width to be substantially nonporous and resistant to mechanical stresses imposed during manufacture and use of the assembly 100. In some examples, each divider 124 has a width of between about 50 nm and about 5 µm. In further examples, each divider 124 preferably has a thickness of between about 200 nm and about 1 µm.

The thickness of the display assembly 100, as defined by the distance between the substrates 104 and 108 may be varied to increase or decrease the contrast provided by the microstructures 120. Specifically, incident light will traverse a larger volume of the electrophoretic media when the thickness of the assembly 100 increases.

The number of microstructures 120 provided in any given display assembly 100 is not particularly limited. In some examples, the microstructures 120 may be vertically oriented (i.e., oriented parallel to the direction of viewing), while in other examples, the microstructures 120 may be horizontally oriented (i.e., forming layers perpendicular to the direction of viewing).

For example, the electrodes 112 and 116 may extend from the inner substrate 108 to the outer substrate 104. Accordingly, the microstructures 120 and the dividers 124 may similarly extend from the inner substrate 108 to the outer substrate 104. In particular, the microstructures 120 may be channels divided by channel walls, wherein the electrophoretic media is an electrophoretic fluid contained by the channel walls.

In other examples, the electrodes 112 and 116 may be parallel and adjacent to, respectively, the inner substrate 108 and the outer substrate 104. That is, the electrodes 112 and 116 may be electrode layers, and the microstructures 120 may be electrophoretic sublayers, having polymer sublayers therebetween (i.e., acting as the dividers 124).

The microstructures 120 are generally included in the display assembly 100 to increase the display quality of the of the assembly 100. For example, one layer of particles may be insufficient to produce a strong enough color to be useful as a display, as the contrast would be very small. By having multiple layers of particles we can increase the number of color absorbing groups through which an incident light ray would pass on its way through the display. In other electrophoretic displays, the particles are completely opaque to light, and may either scatter it or absorb it completely. The particles in the previously disclosed electrophoretic medium are optically transparent and may switch between one color and another. In another example, different microstructures may have different particles to allow multiple colors to be provided to a single pixel or group of pixels of the assembly 100.

Figure 1B:
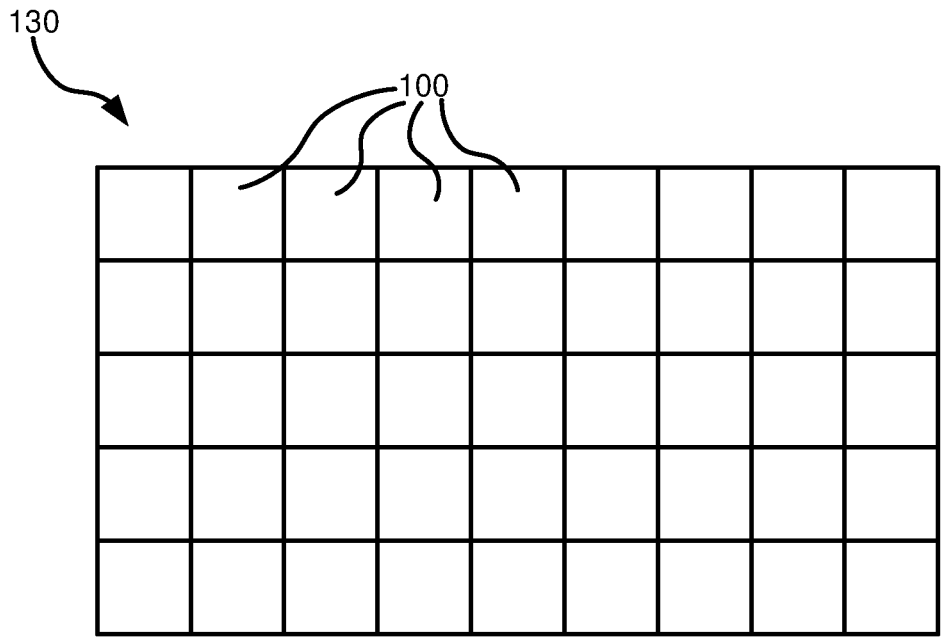
FIG. 1B depicts an example electrophoretic display assembly including multiple electrophoretic display assemblies of FIG. 1A.

Referring to FIG. 1B, an example display device 130 is depicted. The display device 130 includes multiple display assemblies 100, for example arranged in a rectangular array, wherein each display assembly 100 represents one pixel of the display device 130. In other examples, the display assemblies 100 may be arranged on other suitable arrangements. Thus, a complete display may include a plurality of the display assemblies 100, with each assembly 100 including a pair of spaced apart electrodes to control the electrophoretic media of each pixel independently to allow for regular display capabilities. In some examples, each assembly 100 may include a respective controller 118, each controller 118 may be connected to a central display processor of the display device 130. That is, the central display processor may communicate with the controller 118 to apply appropriate voltages to the electrodes 112 and 116 of each assembly 100 according to the image to be displayed on the device 130. In other examples, the central display processor may control the display assemblies 100 directly.

Figure 2A:
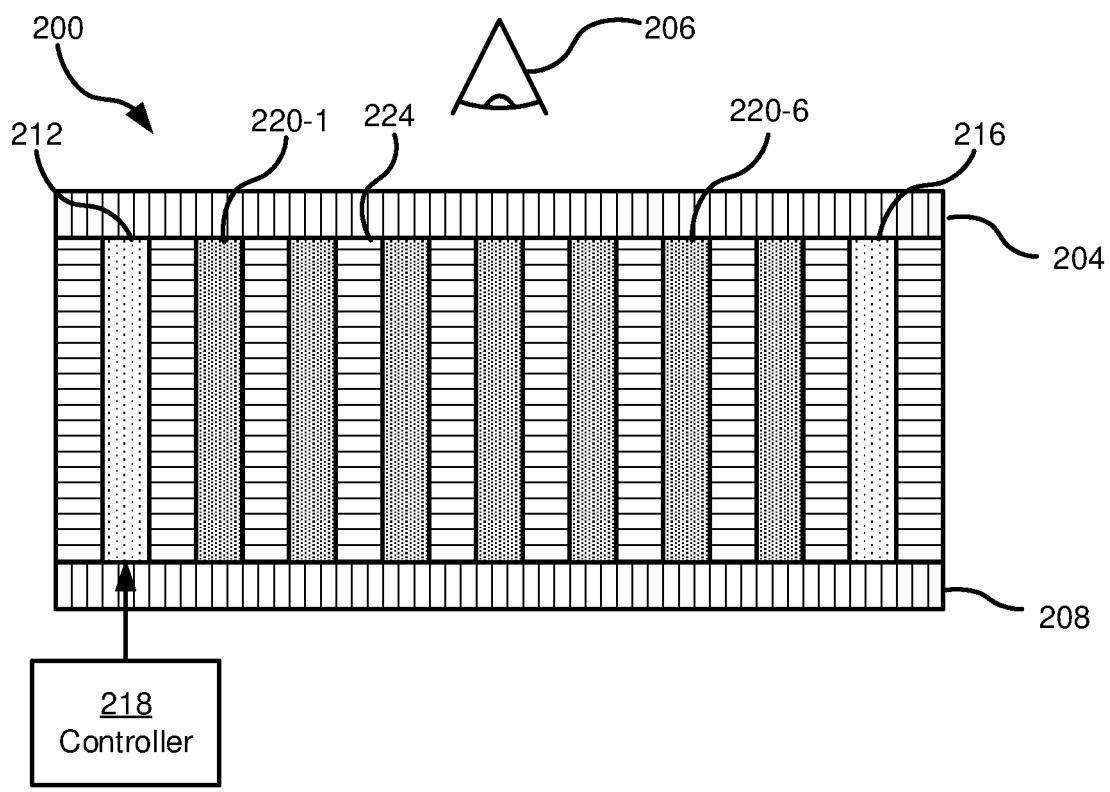
FIG. 2A depicts a cross section of a display assembly, according to a non-limiting embodiment.

For example, referring to FIG. 2A, a display assembly 200 is illustrated that employs a vertical microstructure. The assembly 200 is similar to the assembly 100. Specifically, the assembly 200 includes an outer substrate 204 (e.g., glass or any other translucent or transparent material), referred to as "outer" due to its position away from the interior of an electronic device (not shown) supporting the display assembly 200 and towards a viewer (indicated by the symbol 206). The assembly 200 also includes an inner substrate 208, such as a reflective material; the inner substrate 208 may also be transparent in some embodiments. The substrates 204 and 208 are arranged substantially parallel to one another, and substantially perpendicular to the direction of viewing.

Between the inner and outer substrates 208 and 204, the assembly 200 includes a first electrode 212 and a second electrode 216. The electrodes 212 and 216 extend from the inner substrate 208 to the outer substrate 204 and are disposed in a spaced-apart relationship relative to each other. That is, as seen in FIG. 2A, the electrode 212 is near the left side of the assembly 200 while the electrode 216 is near the right side of the assembly 200. One of the electrodes 212 and 216 is driven by a controller 218 (e.g., connected to the internal electronics of a computing device such as a smartphone or the like), while the other of the electrodes 212 and 216 is a reference electrode. The electrodes 212 and 216 can be fabricated of substantially transparent material, such as silver nanowire or indium tin oxide (ITO). In the present example, however, as the electrodes are arranged parallel to the viewing direction of the assembly 200, minimal light loss is incurred even if one or both of the electrodes 212 and 216 are made of opaque material.

Between the electrodes 212 and 216, the assembly 200 includes at least one channel 220 (seven channels 220 are shown in the example of FIG. 2A). Each channel 220 extends from the inner substrate 208 to the outer substrate 204. The channels 220 are defined by dielectric channel walls, or fins, 124, preferably fabricated from a substantially transparent material. Further, each channel 220 contains— preferably, is filled by—an electrophoretic fluid containing the above-mentioned charged nanoparticles. In the example shown in FIG. 2A, the electrodes 212 and 216 themselves are also located within respective channels defined by additional walls 224. Encapsulating the electrodes 212 and 216 within channels may reduce or eliminate electrolytic reactions between the electrophoretic fluid and the electrodes 212 and 216.

Figure 2B:
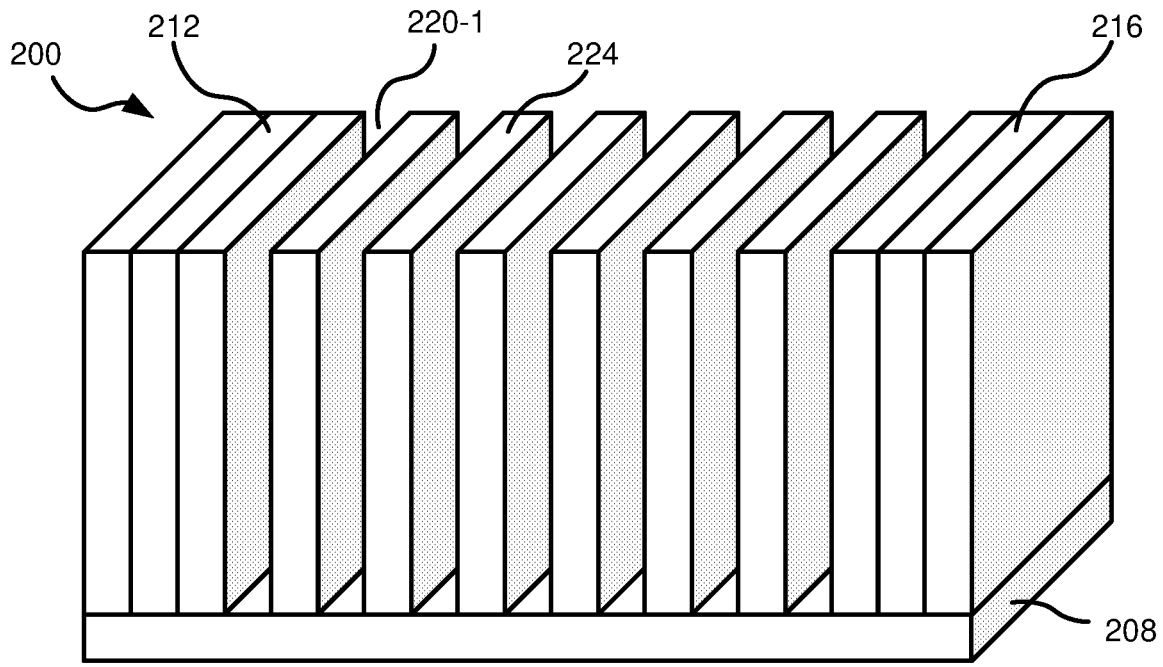
FIG. 2B depicts an isometric view of a partial display assembly, according to a non-limiting embodiment.

As will now be apparent, the electrodes 212 and 216 as well as the channels 220 and the walls 224 are arranged substantially parallel to one another and to the direction of viewing (i.e., perpendicular to the substrates 204 and 208). The channels 220 may also therefore be referred to as a vertical microstructure. FIG. 2B depicts the assembly 200 with the outer substrate 204 as well as the electrophoretic fluid within the channels 220 omitted, to illustrate the orientation of the various components of the assembly 200.

The electrodes 212 and 216 are controllable by the controller 218, which applies voltage differences to the electrodes 212 and 216 to generate an electric field between the electrodes and perpendicular to the channels 220 (and therefore parallel to the substrates 204 and 208). As will be apparent, the electric field controls the separation between oppositely-charged nanoparticles in each channel 220 and therefore controls the absorption spectra (and thus the visual appearance) of the electrophoretic fluid in the channels 220.

The dielectric walls 224 dividing the electrophoretic fluid-containing channels 220 permit the assembly 200 to take advantage of Gauss' law, according to which the electric field in adjacent layers is similar. That is, when the oppositely charged particles in the channel 220-1 separate under the influence of a given electric field applied by the electrodes 212 and 216, then the oppositely charged particles in the adjacent channels (e.g., 220-2) will also separate. In comparison to a single electrophoretic channel with a thickness equal to the total thickness of the thirteen channels 220 shown in FIG. 2A, the arrangement of FIG. 2A permits the generation of an electric field with a lower current requirement imposed on the electrodes 212 and 216.

The number of channels 220 provided in any given display assembly 200 is not particularly limited. In general, as the number of channels 220 increases, the transparency of the assembly 200 increases, but the voltage required to drive the assembly 200 also increases. The assembly 200 includes at least one channel 220, and as many as 30 channels 220. Preferably, the assembly 200 includes 4 or more channels 220 and fewer than 9 channels 220, to reduce manufacturing complexity and increase manufacturing yield. In some embodiments, however, more than 30 channels 220 may be employed. A complete display may include a plurality of assemblies as shown in FIG. 2A (for example, one assembly per pixel, or per subset of pixels), with each assembly including a pair of spaced apart electrodes and at least one channel 220 therebetween.

The height of the channels 220 may be varied to increase or decrease the contrast provided by the assembly 200. Specifically, incident light will be required to traverse a larger volume of electrophoretic fluid for channels 220 with greater heights.

Each channel 220 has a minimum width (i.e., the dimension parallel to the substrates 204, 208) that is sufficient to accommodate two of the above-mentioned charged particles adjacent to one another without being in physical contact (i.e., to be sufficiently separated as to be in their non-interacting state. That is, the width of each channel 220 is at least twice the diameter of the charged particles. The width of each channel 220 is preferably between about 200 nm and about 20 μm. In some examples, the width of each channel 220 is between about 500 nm and about 2 μm. In other examples, however, the width of one or more channels 220 may exceed 200 nm or be smaller than 20 μm. The channel 220 in a given assembly 200 need not have identical widths. In general, the greater the width of a channel 220, the greater the voltage required to drive the channel (i.e., to change the absorption characteristics of the channel 220).

The dielectric fins or walls 224 cause voltage drops across their widths and are therefore limited in width; however, each wall 224 is also of sufficient width to be substantially nonporous and resistant to mechanical stresses imposed during manufacture and use of the assembly 200. In some examples, each wall 224 has a width of between about 50 nm and about 5 μm. In further examples, each wall 224 preferably has a thickness of between about 200 nm and about 1 μm.

Figure 3:
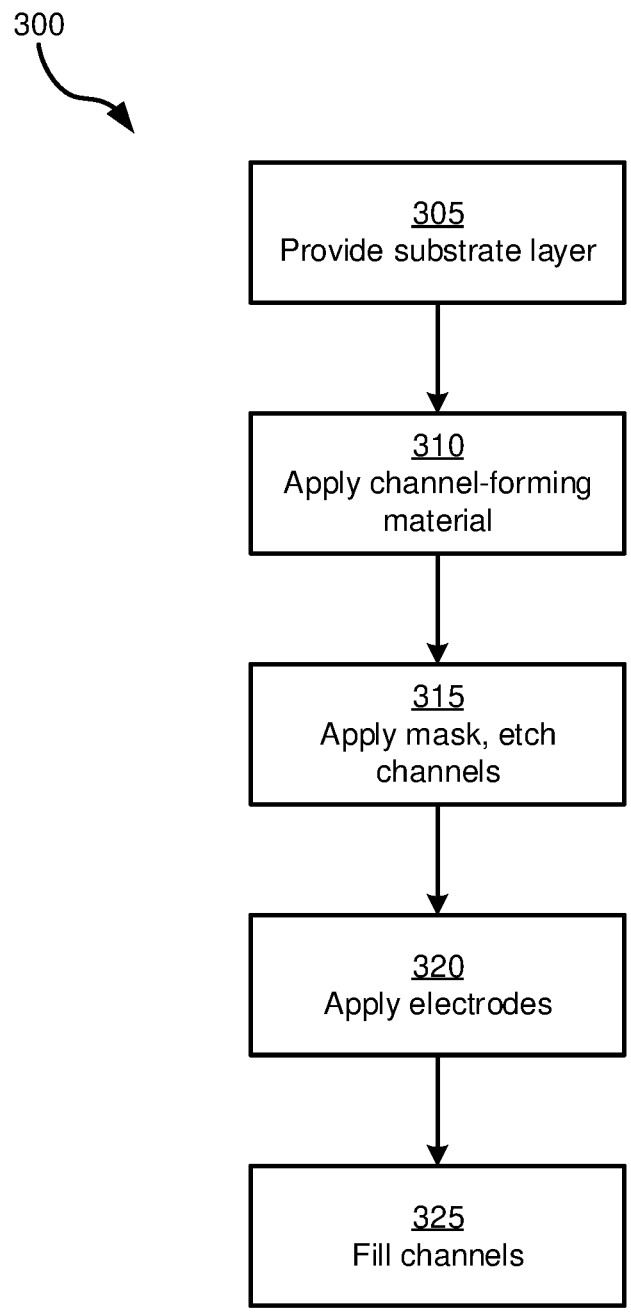
FIG. 3 depicts a method for fabricating the display assembly of FIG. 2, according to a non-limiting embodiment.
Figure 4:
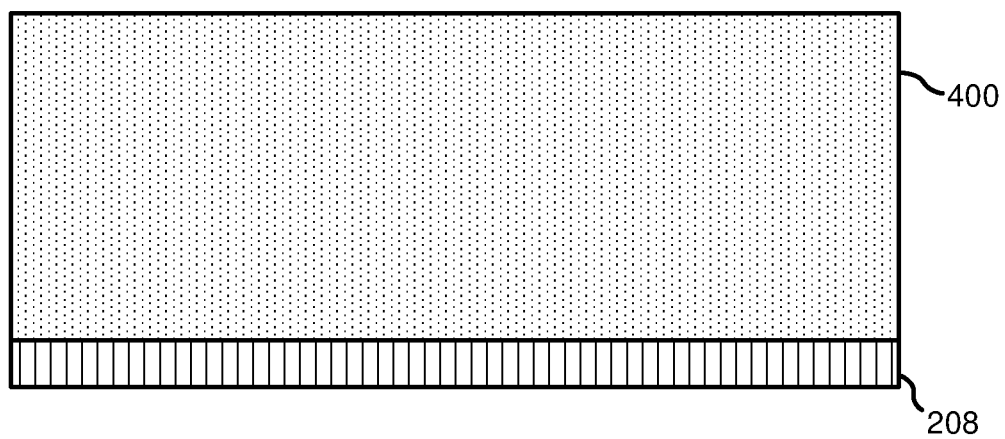
FIG. 4 depicts a performance of block 310 of the method of FIG. 3, according to a non-limiting embodiment.

Various methods of fabricating the assembly 200 are contemplated. Turning to FIG. 3, a method 300 of fabricating a display such as a assembly 200 is illustrated. The performance of the method 300 begins at block 305, at which a transparent sublayer is provided. The substrate can be either of substrate layers 204 and 208, as will be seen below. The substrate may be, for example, silicon dioxide, borosilicate glass or any other doped silicate. Other suitable dielectric substrates will also occur to those skilled in the art. Preferably, the substrate has a coefficient of thermal expansion of $10^{-5}$ $K^{-1}$ or less. In some embodiments, a flexible substrate may be provided. The substrate layer (e.g., 208 as seen in FIG. 4) is preferably thin in order to decrease the thickness of the assembly 200. However, the substrate layer is also sufficiently thick to withstand the manufacturing process. In some examples, the substrate layer has a thickness of 0.1 to 1 mm. Preferably the substrate layer has a thickness of about 0.3 mm to about 0.6 mm.

At block 310, a layer of preliminary material 400 is applied over the substrate (as shown in FIG. 4). In some embodiments, the preliminary layer 400 includes a conductive or semiconductive material, such as a silicon wafer anodically bonded to the substrate layer. The silicon wafer can be thinned by a method such as ICP-RIE. Other methods of depositing the preliminary layer 400 are contemplated, such as by chemical vapor deposition, sputtering, evaporation.

The preliminary layer 400 in such examples can be doped to increase its conductivity (which alters the properties of the dielectric fins 224 which are formed from the layer 400. For example, the layer 400 may consist of silicon doped with boron. In addition, the layer 400 may also be doped with titanium to increase the dielectric constant of oxidized material obtained from the layer 400 (as will be discussed below) and to increase the conductivity of the electrodes formed from the layer 400 (as will also be discussed below). As will be apparent through this discussion, the layer 400 is capable of being etched (e.g., by reactive ion etching, RIE) or other processing techniques to generate high aspect ratio structures therein. In addition, the layer 400 is capable of being oxidized, for example via thermal oxidation (wet or dry). Further, the oxide obtained thereby is preferably substantially transparent and colorless. The oxide may have a lower refractive index than the electrophoretic fluid within the resulting channels 220, which may improve the contrast of the assembly 200 by confining light rays within the electrophoretic fluid.

In the above silicon-based embodiment, the preliminary layer 400 preferably has a thickness of between about 5 μm and about 60 μm. Preferably, the thickness of the layer 400 is between about 20 μm and about 40 μm. In still further examples, the thickness may be greater than 60 μm.

In other embodiments, the preliminary layer 400 includes a polymeric material rather than the above-mentioned silicon-based material. For example, the preliminary layer 400 can be a polymer such as polymethylmethacrylate (PMMA). Preferably, the polymer has a high dielectric constant (which may reduce the voltage required to drive the assembly 200) and is capable of being etched into high aspect ratio structures. A polymeric preliminary material may permit the provision of a flexible display more readily than a silicon-based channel forming material. The polymeric material can be applied to the substrate by, for example, spin-coating or any other suitable treatment.

In the above polymeric embodiment, the channel forming layer 400 preferably has a thickness of between about 5 μm and about 60 μm. Preferably the thickness of the layer 400 is between about 20 μm and about 40 μm. Preferably, the thickness of the layer 400 is about 25 μm.

Returning to FIG. 3, at block 315, a mask material is applied to the surface of the layer 400 away from the substrate provided at block 305. Further, the mask is patterned according to the desired locations and dimensions of the channels 220. Following the application and patterning of the mask material, the channels 220 are etched into the layer 400. The mask material is resistant to the etchant, for example, aluminum if dry etching is used.

Figure 5A:
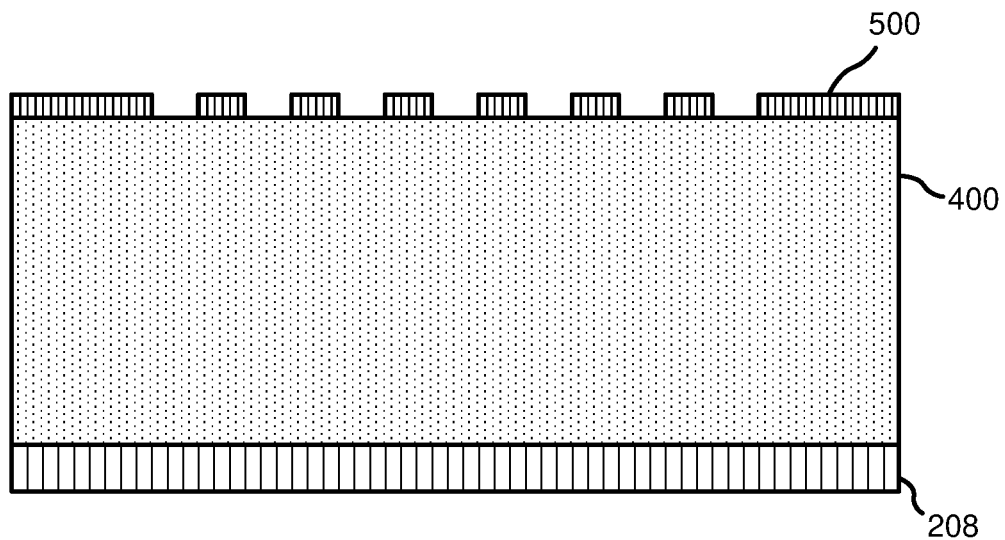
FIGS. 5A-5B depict a performance of block 315 of the method of FIG. 3, according to a non-limiting embodiment.
Figure 5B:
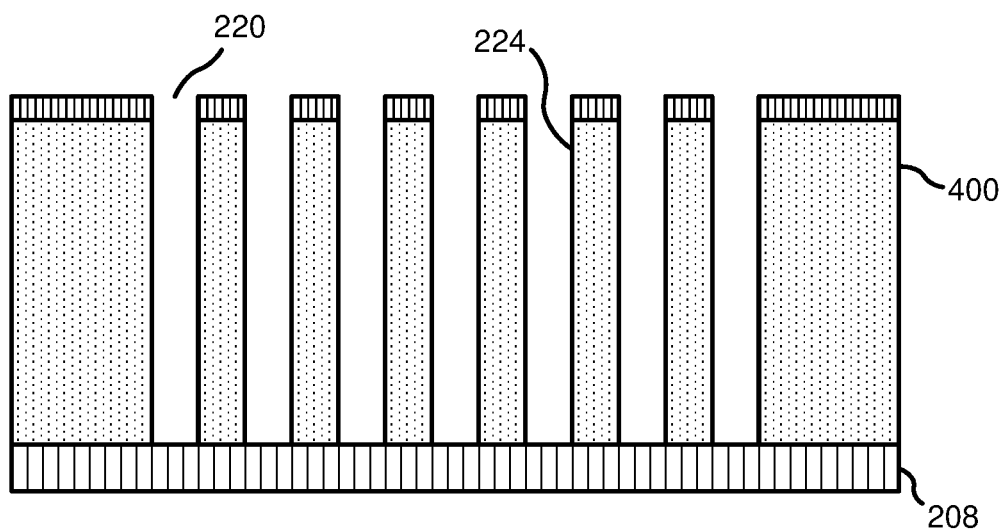

FIGS. 5A and 5B depict the performance of block 315 in connection with the silicon-based embodiment mentioned above. In particular, FIG. 5A illustrates the patterned mask material 500 (e.g., aluminum) as applied to the layer 400. Specifically, the mask material 500 is applied over locations of the resulting walls 224. FIG. 5B depicts the resulting channels 220 etched (e.g., via RIE) from the layer 400 after application and patterning of the masking material 500. As seen in FIG. 5B, the partially fabricated displays in FIGS. 5A and 5B include outer walls 224 having greater widths than the remaining inner walls 224. As will be discussed below in greater detail, the larger walls 224 will form the electrodes 212 and 216 after further processing.

Figure 6A:
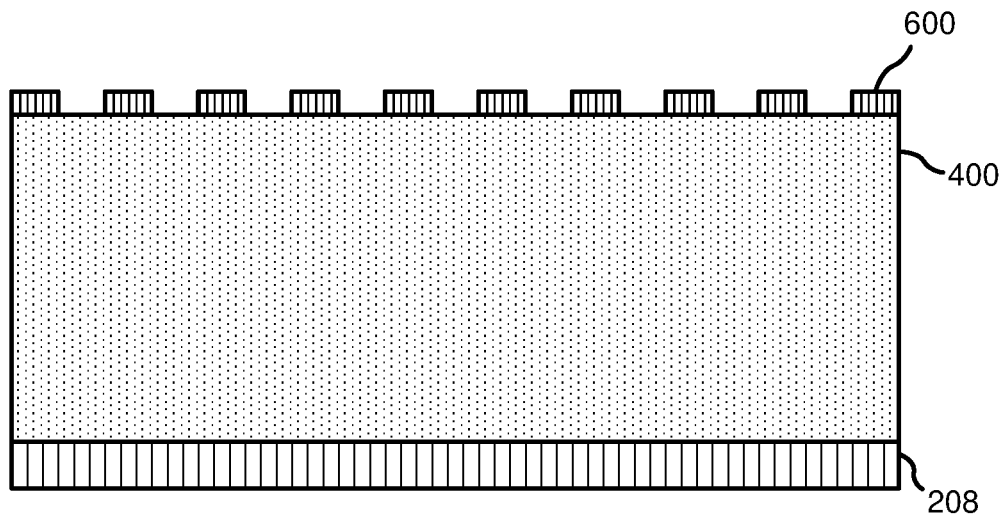
FIGS. 6A-6B depict a performance of block 315 of the method of FIG. 3, according to another non-limiting embodiment.
Figure 6B:
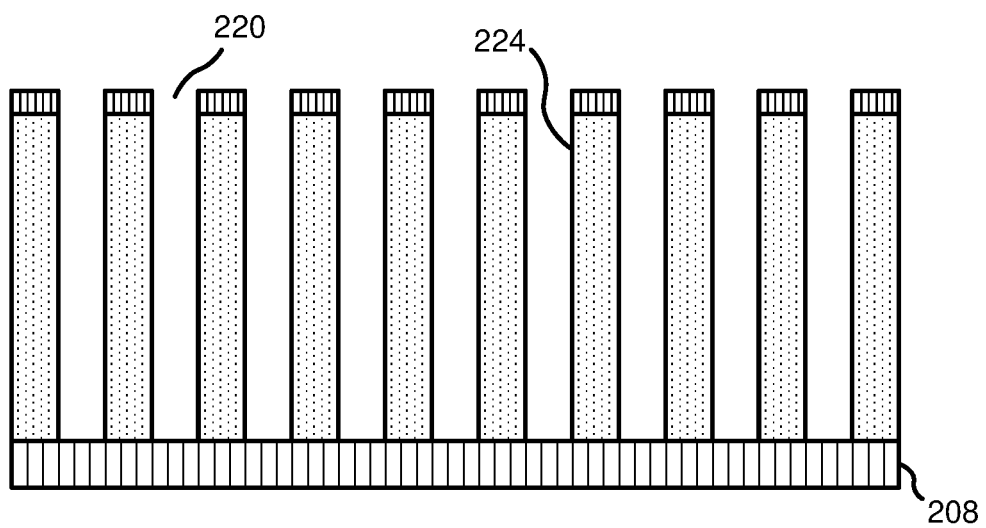

FIGS. 6A and 6B depict the performance of block 315 in connection with the polymer-based embodiment mentioned above. FIG. 6A illustrates the patterned mask material 600 (e.g., aluminum) as applied to the layer 400, and FIG. 6B depicts the resulting channels 220 etched from the layer 400 (e.g., by dry plasma etching) after application and patterning of the masking material 600. In contrast to the silicon-based embodiment, the outer walls 224 need not have greater widths than the inner walls 224 in this embodiment. The etching process employed in connection with the polymer embodiment may also include etching buttresses or other support structures within the channels (e.g., connecting adjacent channels to each other), to prevent the walls 224 from collapsing before completion of the assembly 200.

Referring again to FIG. 3, at block 320, the electrodes 212 and 216 are applied. The particular manner in which the electrodes are applied varies with the nature of the layer 400, as will be discussed below.

Figure 7A:
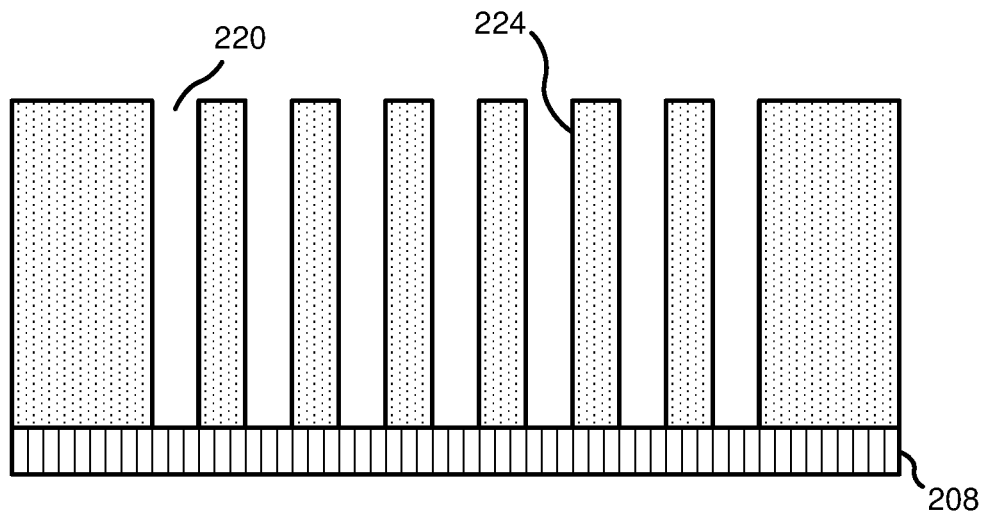
FIGS. 7A-7B depict a performance of block 320 of the method of FIG. 3, according to a non-limiting embodiment.
Figure 7B:
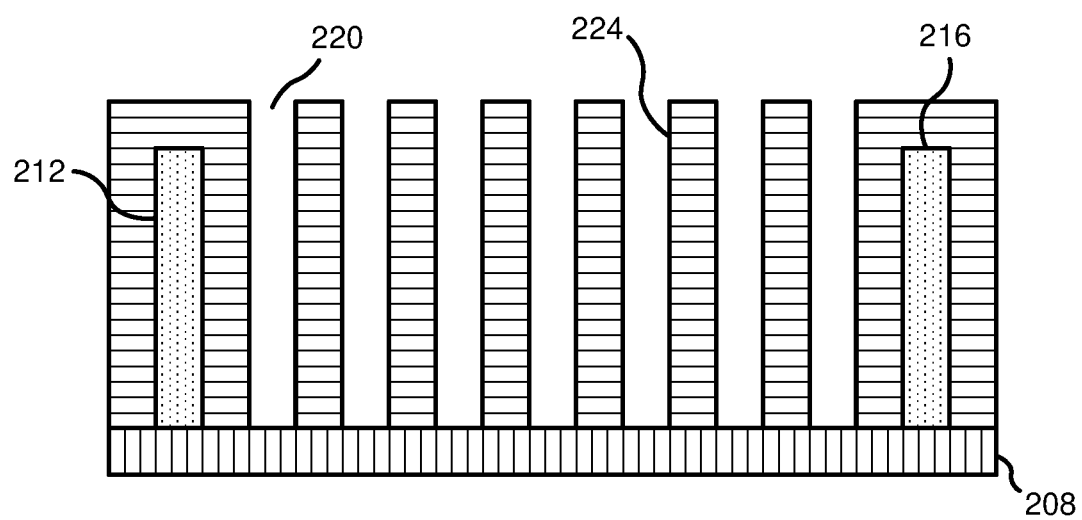

Referring to FIGS. 7A and 7B, the performance of block 320 in connection with the silicon-based embodiment includes removing the mask material 500, as seen in FIG. 7A (e.g., by acid wash, grinding, or any other suitable process). Following removal of the mask material, the walls 224 formed by the preliminary material 400 are oxidized (e.g., by baking), as shown in FIG. 6B. Oxidation of the walls 224 leads to conversion of the walls 224 into transparent silicon dioxide or other similar silicates. The wider outer walls 224, however, are not oxidized throughout their entire thicknesses, and therefore include conductive cores (formed of the preliminary material 400) which form the electrodes 212 and 216. That is, the wider outer walls 224 are only partially oxidized, such that the preliminary material 400 forms the conductive cores of the outer walls, thereby forming the electrodes 212 and 216.

Figure 8A:
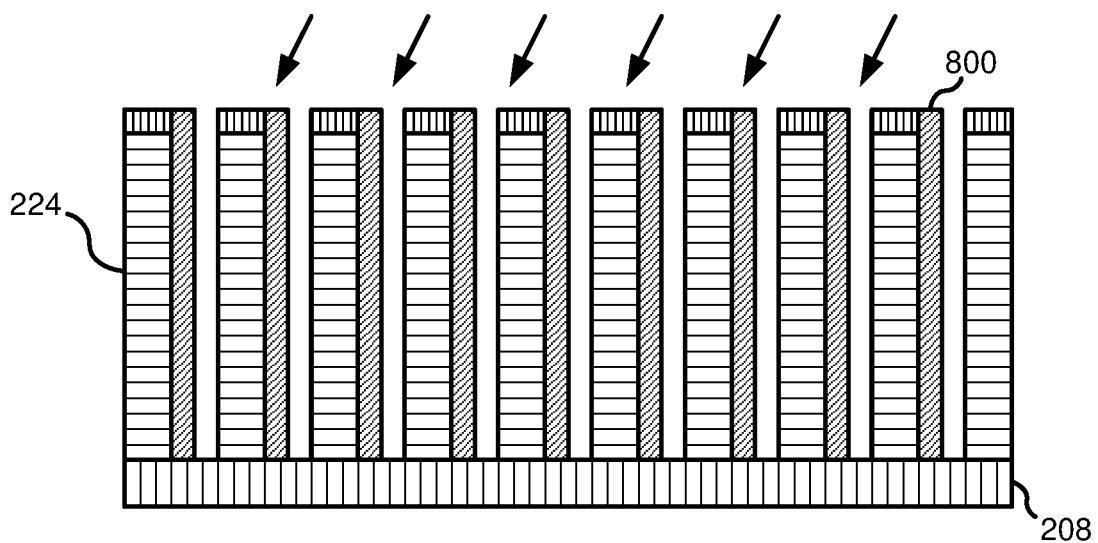
FIGS. 8A-8C depict a performance of block 320 of the method of FIG. 3, according to another non-limiting embodiment.
Figure 8B:
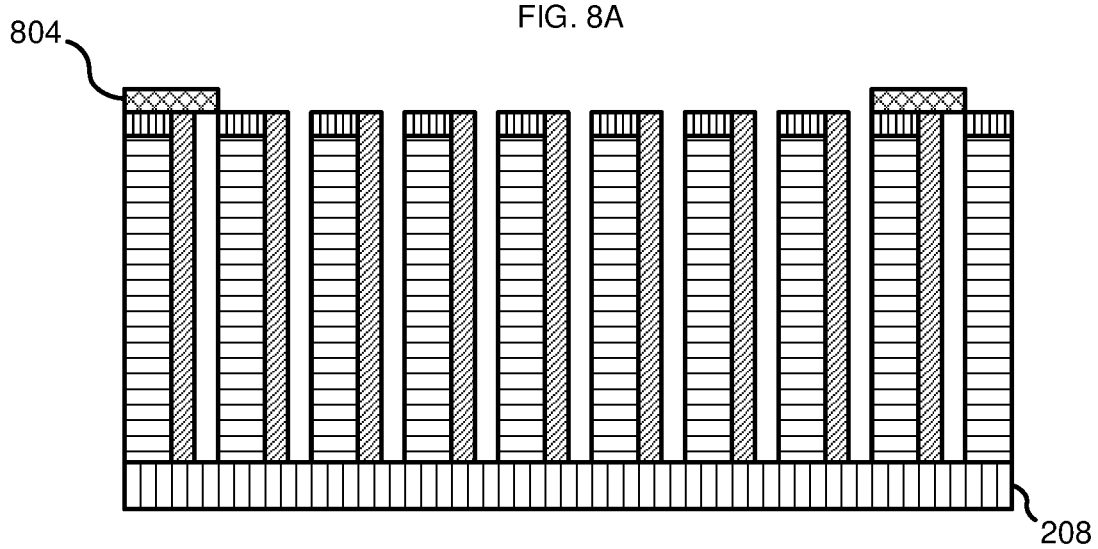
Figure 8C:
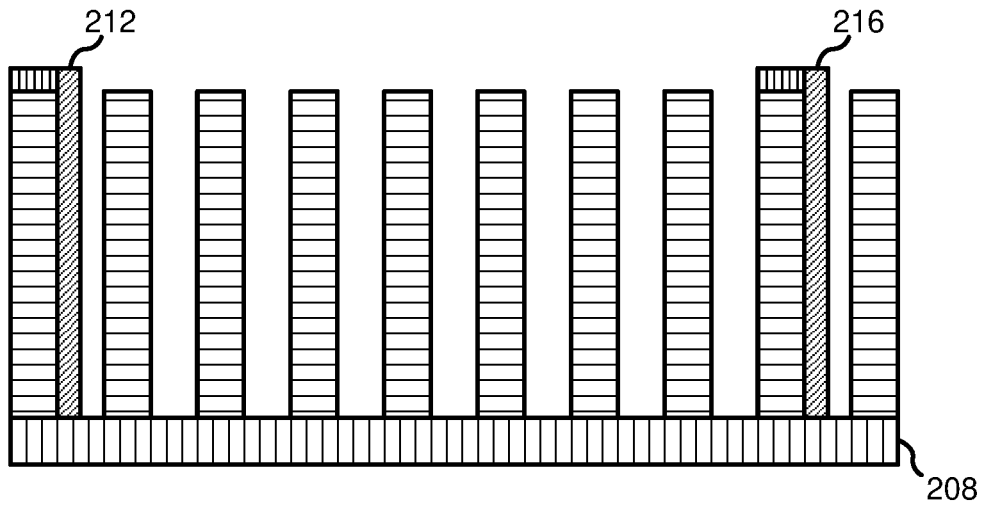

Turning now to FIGS. 8A-8C, an example process for performing block 320 in connection with the polymeric embodiment is illustrated. As seen in FIG. 8A, a conductive material 800, which in the present example is the same as the mask material (e.g., aluminum) is deposited onto one side of each wall 224, for example by depositing the material at a glancing angle (e.g., via angled e-beam evaporation), as indicated by the arrows in FIG. 8A.

Following deposition of the conductive material, certain channels 220 are covered with caps 804 of any suitable covering material, as shown in FIG. 8B. Specifically, the caps 804 cover electrode channels where the first and second electrodes 212 and 216 are to be placed. The caps 804 are therefore also placed over the conductive material in the electrode channels. Finally, the masking and conductive material 500/800 is removed (e.g., by application of a solvent), as shown in FIG. 8C. The caps 804 are also removed after application of the solvent, leaving the conductive material underneath untouched by the solvent. The remaining conductive material comprises the electrodes 212 and 216.

Returning to FIG. 3, at block 320, the channels 220 are filled with electrophoretic fluid. In the silicon-based embodiment, prior to performing block 325, the interior surface of each channel 220 can be treated with a surface treatment to improve the filling of the channels 220 (e.g., by increasing the wettability of the channels 220). Examples of surface treatments include a silane-based material, such as trichlorododecylsilane, to decrease the surface energy of the structure in the case where the electrophoretic fluid comprises a non-polar suspension fluid, or a polar silane such as acetoxyethyldimethylchlorosilane to make the structure more polar where a polar suspension fluid is used in the electrophoretic fluid.

The surface treatment may be applied, for example, in a vacuum chamber by evaporating the silane (from a liquid form) onto the partially fabricated assembly 200. Other surface treatments may also be applied, such as oxygen plasma.

The channels 220 are filled with electrophoretic fluid, preferably under lower than atmospheric pressure (e.g., in a partial vacuum) to ensure complete filling of the channels 220 by the electrophoretic fluid.

Figure 9:
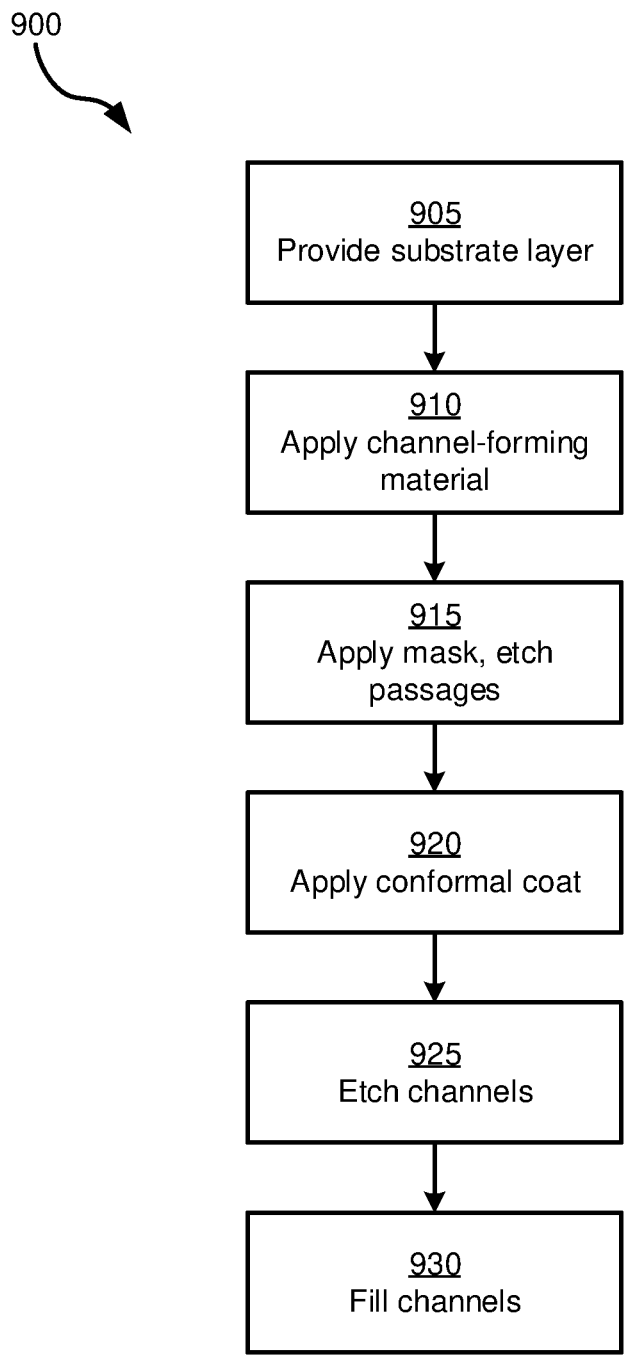
FIG. 9 depicts a method for fabricating the display assembly of FIG. 2, according to another non-limiting embodiment.

Turning to FIG. 9, another example method 900 of fabricating a display such as a assembly 200 is illustrated. The method 900 is similar in some respects to the method 300, and utilizes a double patterning technique. The performance of the method 900 begins at block 905, at which a transparent sublayer is provided. The substrate can be either of substrate layers 204 and 208, as will be seen below. The substrate may be, for example, silicon dioxide, borosilicate glass or any other doped silicate. Other suitable dielectric substrates will also occur to those skilled in the art. Preferably, the substrate has a coefficient of thermal expansion of $10^{-5}$ $K^{-1}$ or less. In some embodiments, a flexible substrate may be provided. The substrate layer is preferably thin in order to decrease the thickness of the assembly 200. However, the substrate layer is also sufficiently thick to withstand the manufacturing process. In some examples, the substrate layer has a thickness of 0.1 to 1 mm. Preferably the substrate layer has a thickness of about 0.3 mm to about 0.6 mm.

At block 910, a layer of preliminary material is applied over the substrate (for example, as illustrated as preliminary layer 400 in FIG. 4). In some embodiments, the preliminary layer includes a conductive or semiconductive material, such as a silicon wafer anodically bonded to the substrate layer. The silicon wafer can be thinned by a method such as ICP-RIE.

The preliminary layer 400 in such examples can be doped to increase its conductivity (which alters the properties of the dielectric fins 224 which are formed from the preliminary layer 400. For example, the layer 400 may consist of silicon doped with boron. In addition, the layer 400 may also be doped with titanium to increase the dielectric constant of oxidized material obtained from the layer 400 and to increase the conductivity of the electrodes formed from the layer 400. As will be apparent through this discussion, the layer 400 is capable of being etched (e.g., by reactive ion etching, RIE) or other processing techniques to generate high aspect ratio structures therein. The preliminary layer 400 preferably has a thickness of between about 5 μm and about 60 μm. Preferably, the thickness of the layer 400 is between about 20 μm and about 40 μm.

Returning to FIG. 9, at block 915, a mask material is applied to the surface of the preliminary layer away from the substrate provided at block 905. Further, the mask is patterned according to the desired locations and dimensions of the channels 220.

According to a first embodiment, the double patterning of the mask materials may be applied at block 915. Specifically, an electrode mask material, such as chromium, may be applied onto the preliminary layer where the electrodes 212 and 216 are to be placed. Additionally, a channel mask material, such as aluminum, is applied on the preliminary layer over the locations of every second channel 220.

According to a second embodiment, only a channel mask material (e.g., aluminum) is applied at block 915. Specifically, the channel mask material is applied on the preliminary locations of every second channel 220.

Following the application and patterning of the mask material(s), the layer 400 is etched to form trenches that are wider than the resulting channels 220. The channel mask material is resistant to the etchant, for example, aluminum if dry etching is used.

Figure 10A:
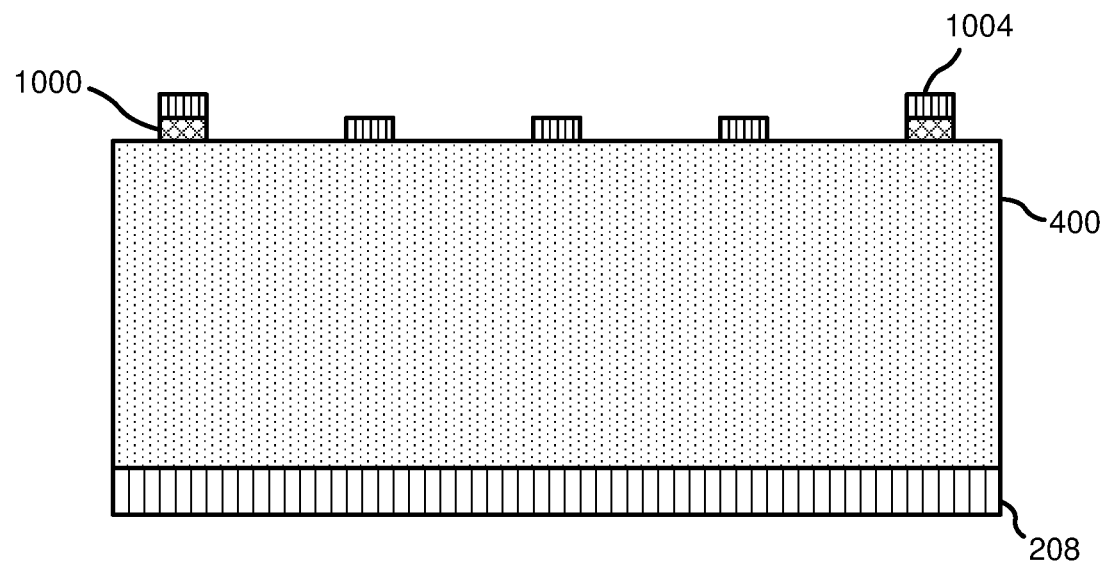
FIGS. 10A-10B depict a performance of block 915 of the method of FIG. 9, according to a non-limiting embodiment.
Figure 10B:
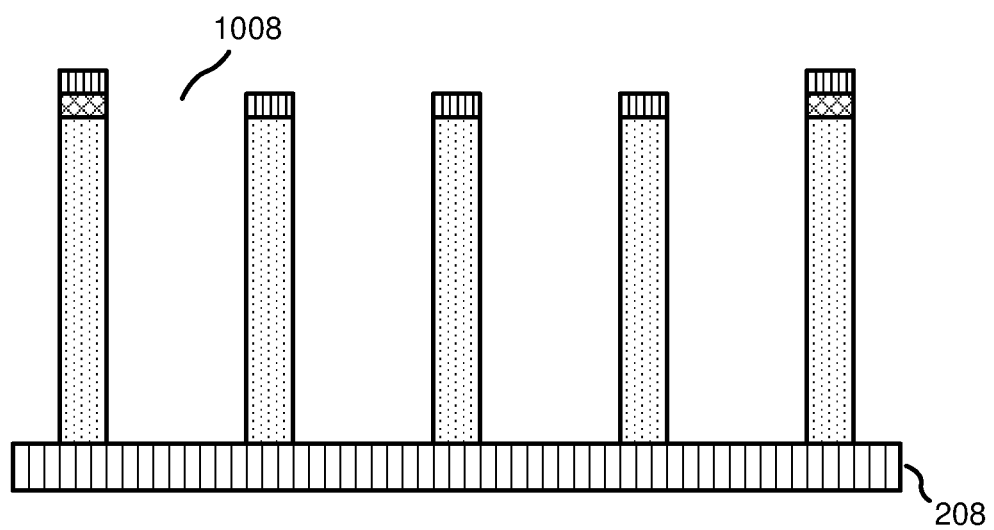

FIGS. 10A and 10B depict the performance of block 915 in connection with the first double-patterning embodiment mentioned above. In particular, FIG. 10A illustrates the electrode mask material 1000 (e.g., chromium) as applied over the layer 400, and specifically, over the end locations of the electrodes 212 and 216, as well as a channel mask material 1004 (e.g., aluminum) as applied over the layer 400, over every second channel. FIG. 10B depicts the result after the layer 400 is etched to form trenches 1008.

Figure 11A:
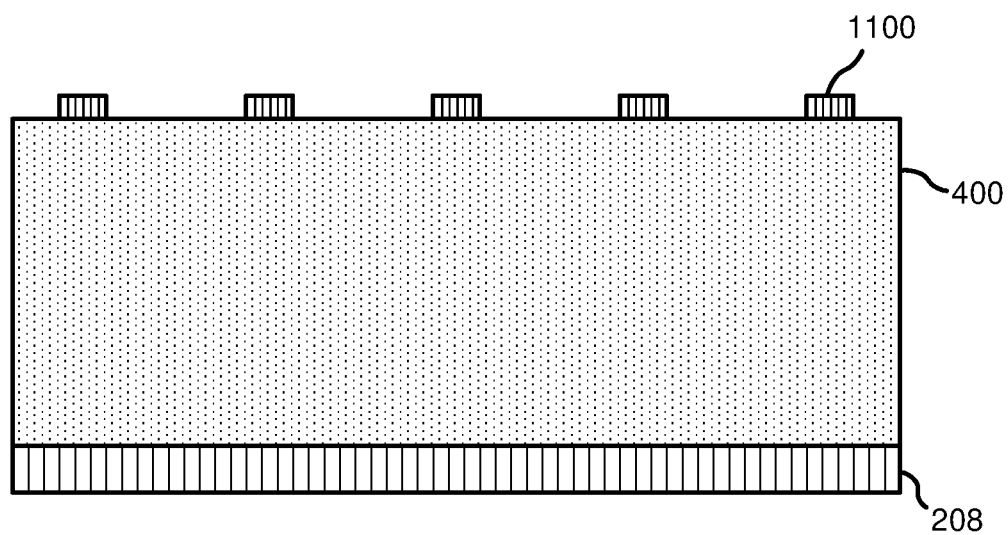
FIGS. 11A-11B depict a performance of block 915 of the method of FIG. 9, according to another non-limiting embodiment.
Figure 11B:
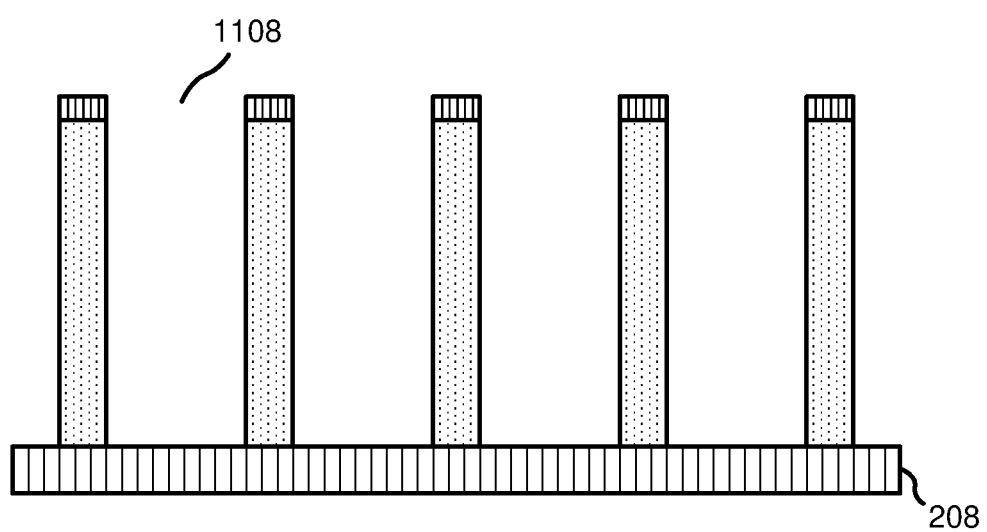

FIGS. 11A and 11B depict the performance of block 915 in connection with the second double-patterning embodiment mentioned above. In particular, FIG. 11A illustrates a channel mask material 1100 (e.g., aluminum) as applied the layer 400, over every second channel. FIG. 11B depicts the result after the layer 400 is etched to form trenches 1108.

Returning to FIG. 9, at block 920, a conformal coat is applied to the entire structure. In some examples, the conformal coat may be a dielectric material which forms the resulting walls 224, such as silica, titanium doped silica, or another dopant to change the refractive index as needed. In the first double-patterning embodiment, prior to applying the conformal coat of silica, the second patterned mask material 1004 may be removed.

Figure 12:
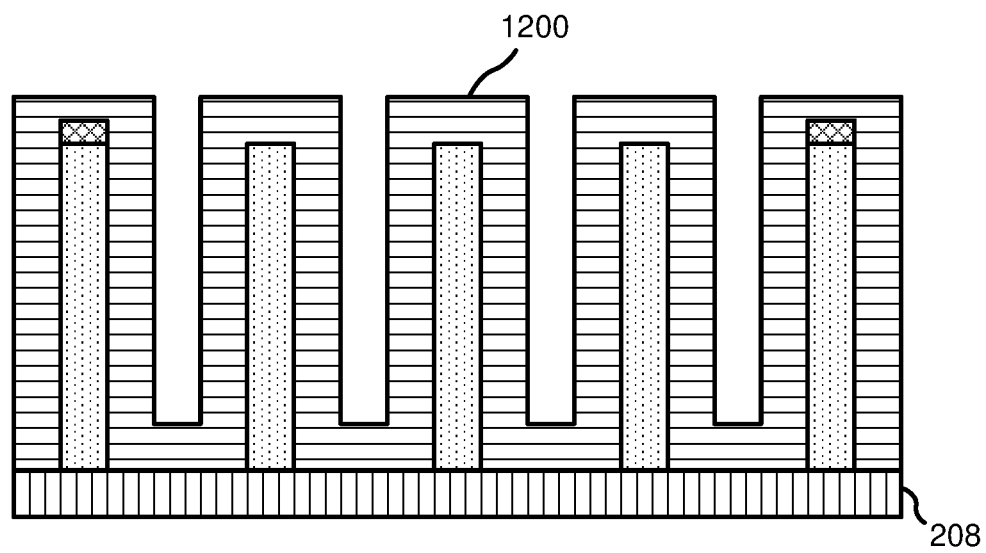
FIG. 12 depicts a performance of block 920 of the method of FIG. 9, according to a non-limiting embodiment.

FIG. 12 depicts the performance of block 920 in connection with the first double-patterning embodiment. As can be seen, in FIG. 12, the channel mask material 1004 is removed, and the assembly (i.e., the remaining portions of the layer 400 after etching) is covered with a conformal coat 1200 (e.g., of silica).

Figure 13:
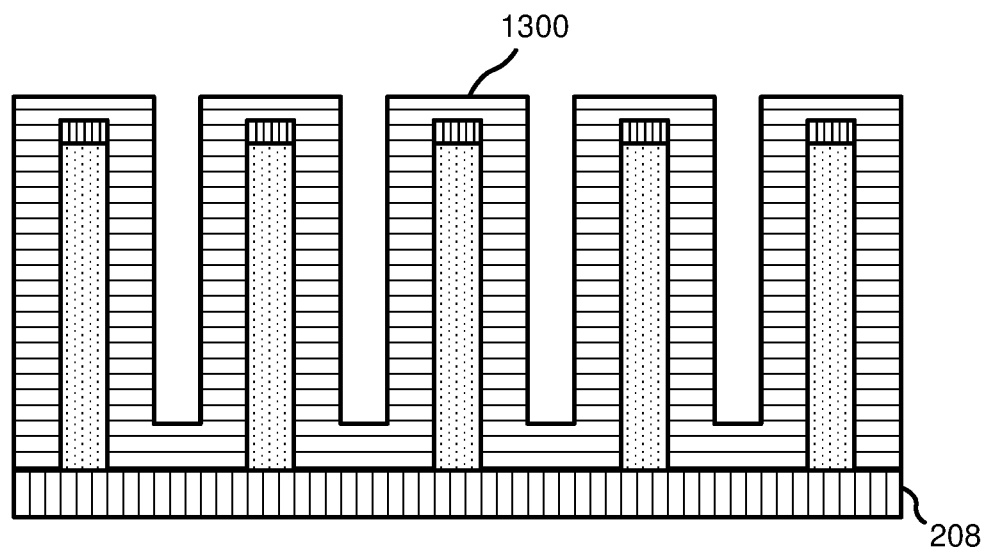
FIG. 13 depicts a performance of block 920 of the method of FIG. 9, according to another non-limiting embodiment.

FIG. 13 depicts the performance of block 920 in connection with the second double-patterning embodiment. As can be seen, in FIG. 13, the structure (i.e., the remaining portions of the layer 400 after etching) is covered with a conformal coat 1300 (e.g., of silica).

Referring again to FIG. 9, at block 925 the structure is etched to remove a top portion of the conformal coat to expose a portion of the preliminary material, and then etched again to remove any exposed preliminary material, to form the channels 220.

Figure 14A:
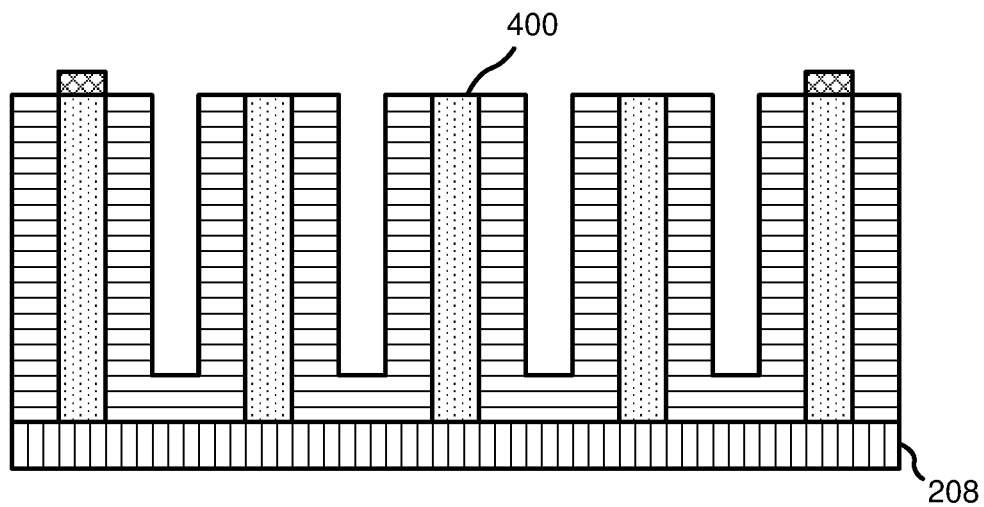
FIGS. 14A-14B depict a performance of block 925 of the method of FIG. 9, according to a non-limiting embodiment.
Figure 14B:
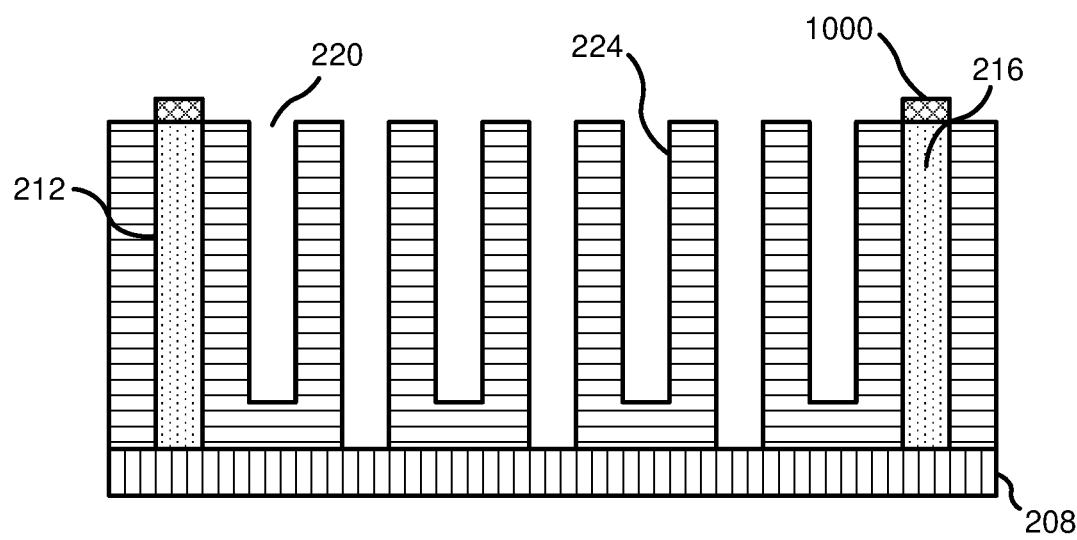

For example, referring to FIG. 14A, in the first double-patterning embodiment, the top portion of the conformal coat is etched (e.g., anisotropically), leaving some exposed preliminary material 400. In FIG. 14B, the exposed preliminary material is etched to form the channels 220. Further, the layer 400 masked by the electrode mask material 1000 forms the electrodes 212 and 216. Optionally, at block 925, the electrode mask material 1000 may be removed. In some examples, the electrode mask material 1000 may be left in place to provide a better electrical connection to the electrodes 212 and 216.

Figure 15A:
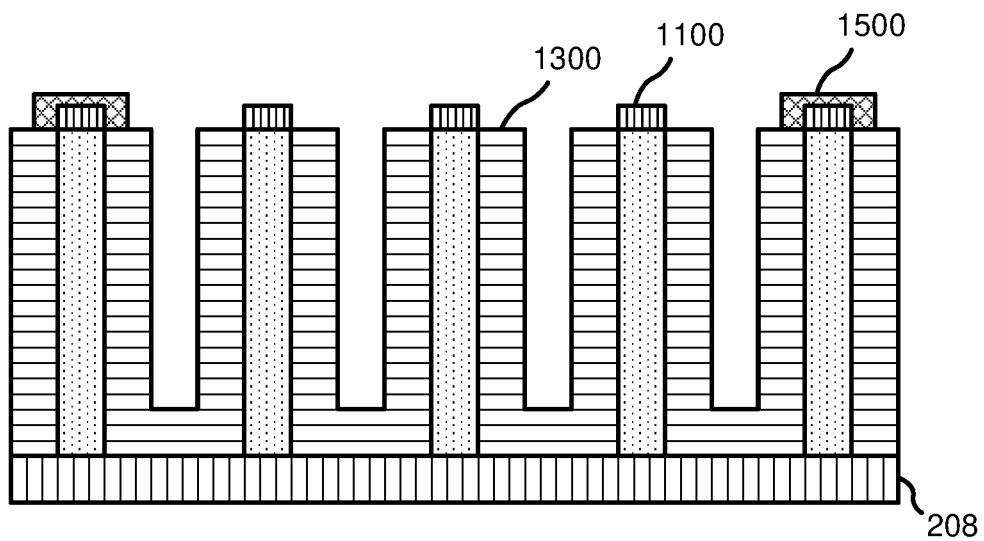
FIGS. 15A-15C depict a performance of block 925 of the method of FIG. 9, according to another non-limiting embodiment.
Figure 15B:
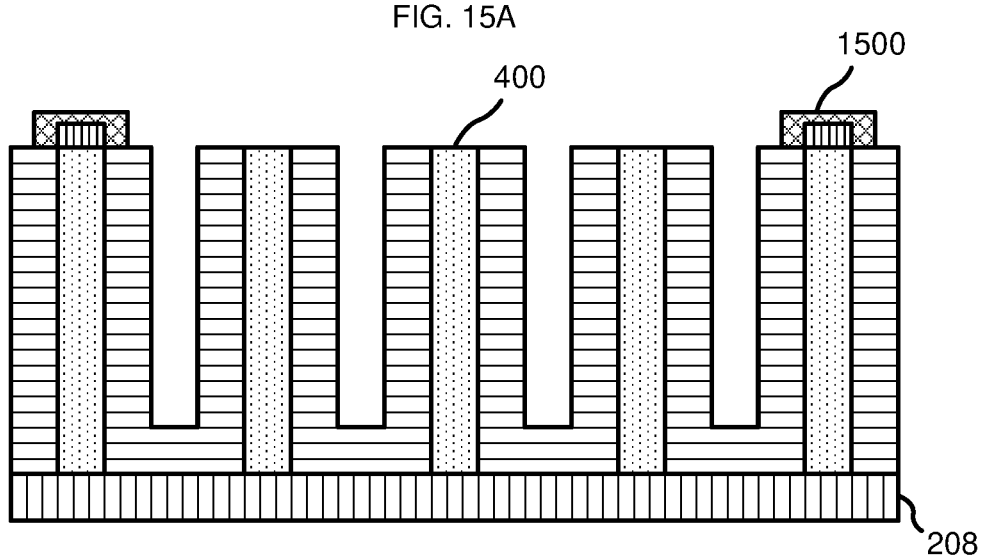
Figure 15C:
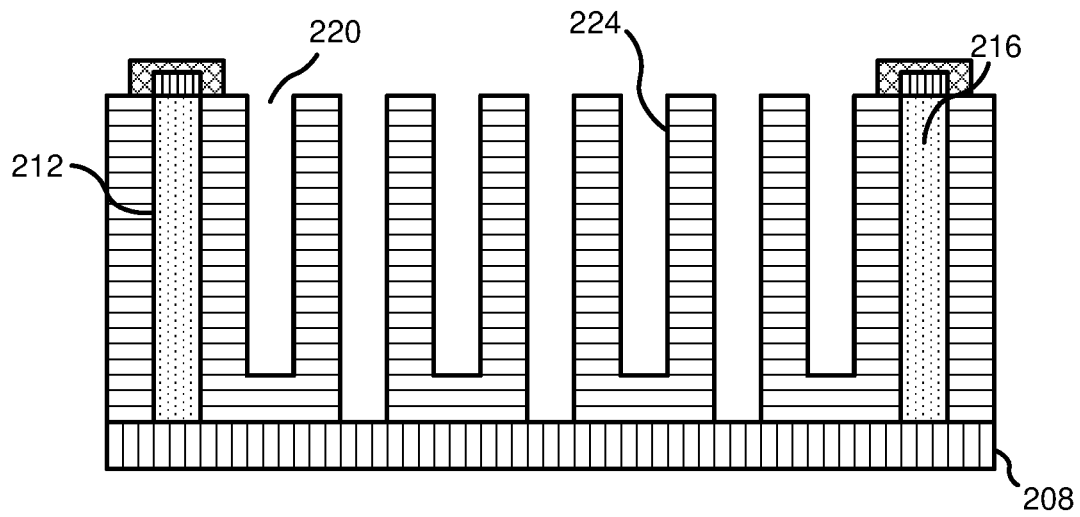

In the second double-patterning embodiment, at block 925, the top portion of the silica is etched (e.g., anisotropically), exposing the channel mask material 1100. At this point, the electrode mask material is applied and patterned over the channel mask material where the electrodes are to be placed. For example, FIG. 15A depicts the assembly with the top portion etched, and an electrode mask material 1500 forming a protective layer over top of the channel mask material 1100 where the electrodes are to be placed. In FIG. 15B, the exposed aluminum is etched, thereby leaving some exposed preliminary material 400. Accordingly, it will be apparent that the electrode mask material 1500 is resistant to the etchant used to remove the channel mask material 1100. In FIG. 15C, the exposed silicon is etched to form the channels 220. Further, the layer 400 masked by the electrode mask material 1500 (over the channel mask material 1100) forms the electrodes 212 and 216. Optionally, at block 925, the electrode mask material 1500 and the remaining channel mask material 1100 may be removed.

Returning to FIG. 9, at block 930, the channels 220 are filled with electrophoretic fluid. In some embodiments, prior to performing block 930, the interior surface of each channel 220 can be treated with a surface treatment to improve the filling of the channels 220 (e.g., by increasing the wettability of the channels 220). Examples of surface treatments include a silane-based material, such as trichlorododecylsilane, to decrease the surface energy of the structure in the case where the electrophoretic fluid comprises a non-polar suspension fluid, or a polar silane such as acetoxyethyldimethylchlorosilane to make the structure more polar where a polar suspension fluid is used in the electrophoretic fluid.

The surface treatment may be applied, for example, in a vacuum chamber by evaporating the silane (from a liquid form) onto the partially fabricated assembly 200. Other surface treatments may also be applied, such as oxygen plasma.

The channels 220 are filled with electrophoretic fluid, preferably under lower than atmospheric pressure (e.g., in a partial vacuum) to ensure complete filling of the channels 220 by the electrophoretic fluid.

As will now be apparent, other fabrication steps may also be performed to complete the assembly 200. For example, a sealant may be applied over the open tops of the channels 220 once they are filled with the electrophoretic fluid, to prevent evaporation of the electrophoretic fluid. The sealant can be an optically transparent epoxy, polyimide resin, or other suitable polymeric resin or transparent inorganic material such as glass.

Figure 16A:
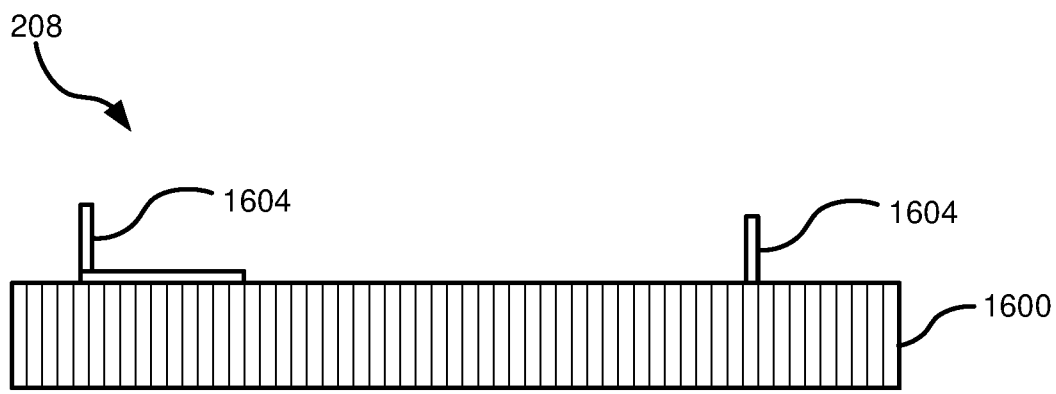
FIG. 16A-16B depict an example application of electronics to a substrate of the display assembly of FIG. 2A, according to a non-limiting embodiment
Figure 16B:
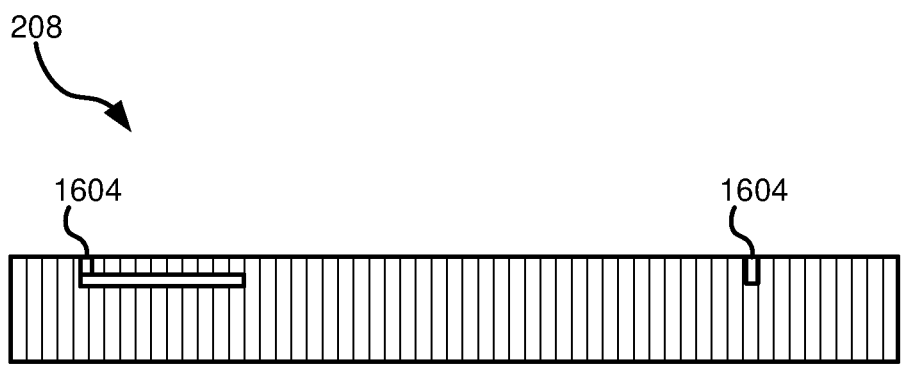

The other of the two substrate layers 204 and 208 is also applied. In addition, control electronics for connecting the electrodes 212 and 216 to the controller 218 are also installed. The electronics may be applied after block 325, or before block 310 of the method 300, or after block 930, or before block 910 of the method 900. In some embodiments, as shown in FIG. 16A, the substrate 208 may be constructed by providing a base layer of substrate material 1600, onto which are placed thin film electronic components 1604. Following placement of the electronics, an additional layer of substrate material is deposited, and the resulting assembly is planarized, as shown in FIG. 16B, leaving the electronic components exposed at the surface of the substrate 208 for eventual connection to the electrodes 212 and 216.

In other embodiments, the electronics mentioned above may be placed along with the opposing substrate after the performance of blocks 325 or 930. For example, the electronics may be included in a member (e.g., the substrate 204) sealed over the open ends of the channels 220. In the case of the silicon-based embodiment, this typically also requires etching away the tops of the walls 224 that contain the electrodes 212 and 216, to expose the conductive cores.

Figure 17:
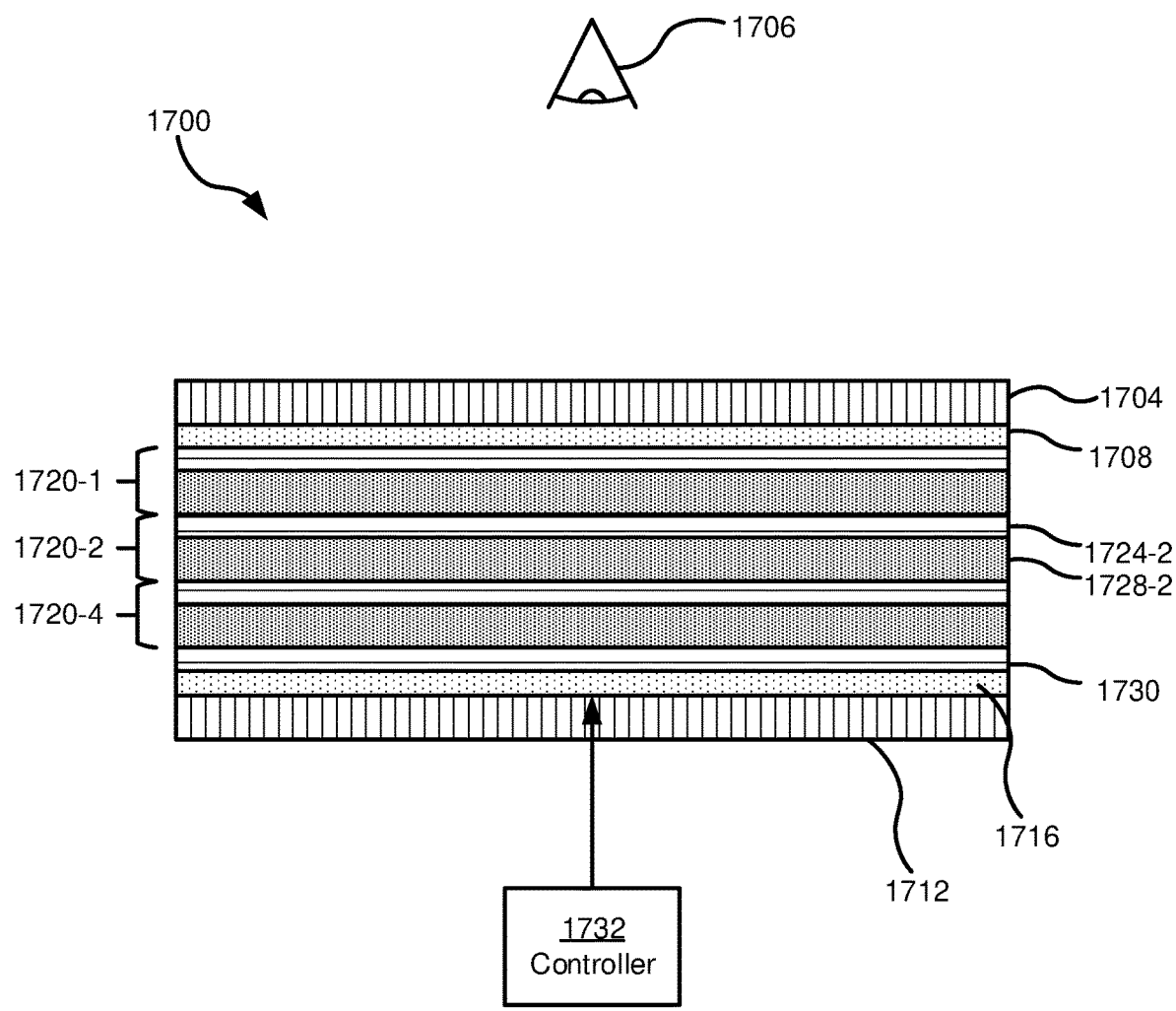
FIG. 17 depicts a cross section of a display assembly, according to a non-limiting embodiment.

According to another example, referring to FIG. 17, a display assembly 1700 is illustrated that employs a horizontal microstructure. The assembly 1700 is also similar to the assembly 100. The assembly 1700 includes an outer substrate 1704 (e.g. glass or any other translucent or transparent material), referred to as "outer" due to its position away from the interior of an electronic device (not shown) supporting the display assembly 1700 and towards a viewer (indicated by the symbol 1706).

The assembly 1700 also includes an outer electrode layer 1708, such as an indium tin oxide (ITO) film electrode. Other materials, such as silver nanowires, may also be employed in addition to or instead of ITO to construct the electrode 1708. The outer electrode 1708 is translucent or transparent, to allow the passage of ambient light into the assembly 1700 for absorption, transmission or reflection. The outer electrode 1708 is adjacent to the outer substrate 1704, and in the present embodiment is directly affixed to the inner side of the outer substrate 1704. In other embodiments, additional materials (e.g. adhesives) may be placed between the outer substrate and the outer electrode.

The assembly 1700 also includes an inner substrate 1712 and an inner electrode 1716 adjacent to the inner substrate 1712. The inner substrate, in some examples, has a reflective surface provided by a substrate such as glass or a polymer carrying a dispersion of titanium dioxide nanoparticles in a polymeric matrix which reflects light diffusely, or a polished metallic surface which reflects light specularly. In other examples, the inner substrate 1712 is a substantially transparent material such as glass which allows light to pass therethrough. In the present embodiment, the inner electrode 1716 is affixed directly to the outer surface of the inner substrate 1712. As mentioned above, however, in some embodiments the inner electrode 1716 and the inner substrate 1712 need not be directly adjacent. The inner electrode 1716, in the present example, is translucent or transparent (e.g. an ITO film or array of silver nanowires). In other examples, however, the inner electrode 1716 may provide a reflective surface.

In addition, the assembly 1700 includes at least one optical filter layer 1720 between the outer and inner electrodes 1708 and 1716. Preferably, a plurality of optical filter layers 1720 are included. In the illustrated example, three optical filter layers 1720-1, 1720-2 and 1720-3 are included in the assembly 1700. Each optical filter layer 1720 includes an electrophoretic sublayer 1728 (sublayer 1728-2 is labelled in FIG. 17) and a polymer sublayer 1724 (sublayer 1724-2 is labelled in FIG. 17). Further, an additional polymer sublayer 1730 may be included between the inner electrode 1716 and the electrophoretic sublayer 1728-3. The polymer sublayers immediately adjacent to the electrodes 1708 and 1716 reduce or eliminate undesirable electrolysis reactions that may degrade the electrodes and electrophoretic media. The polymer sublayers 1724 are each formed of a translucent or transparent dielectric polymer.

As will now be apparent, the substrates 1704 and 1712, the electrodes 1708 and 1716, and the layers 1720 are arranged substantially parallel to one another, and substantially perpendicular to the direction of viewing. The electrodes 1708 and 1716 are controllable by a controller 1732, which applies voltage differences to the electrodes 1708 and 1716 to generate an electric field between the electrodes and perpendicular to the layers 1720. As will be apparent, the electric field controls the separation between oppositely-charged nanoparticles in each electrophoretic sublayer 1728, and therefore controls the absorption spectra (and thus the visual appearance) of the sublayers 1728.

The polymer sublayers 1724 between the electrophoretic sublayers 1728 permits the assembly 1700 to take advantage of Gauss' law, according to which the electric field in adjacent layers is similar. That is, when the oppositely charged particles in the sublayer 1728-1 separate under the influence of a given electric field applied by the electrodes 1708 and 1716, then the oppositely charged particles in the adjacent sublayers (e.g. 1728-2) will also separate. In comparison to a single electrophoretic sublayer with a thickness equal to the total thickness of the three sublayers 1728 shown in FIG. 17, the arrangement of FIG. 17 permits the generation of an electric field with a lower current requirement imposed on the electrodes 1708 and 1716.

The number of layers 1720 provided in any given display assembly 1700 is not particularly limited. For example, for some optically active components, a single layer may not produce sufficient contrast to be useful alone. In such examples, providing additional layers containing further amounts of the same optically active components serves to increase contrast. In further examples, different layers 1720 may contain different sets of optically active components (e.g. for generating different colors). The assembly 1700 includes at least one layer 1720, and as many as 30 layers 1720. Preferably, the assembly 1700 includes fewer than 10 layers 1720, to reduce manufacturing complexity and increase manufacturing yield. In some embodiments, however, more than 30 layers 1720 may be employed.

Each sublayer 1728 has a minimum thickness that is sufficient to accommodate two of the above-mentioned charged particles adjacent to one another without being in physical contact (i.e. to be sufficiently separated as to be in their non-interacting state). That is, the thickness of each sublayer 1728 is at least twice the diameter of the charged particles. The thickness of each sublayer 1728 is preferably between about 200 nm and about 20 μm. In some examples, the thickness of each sublayer 1728 is between about 500 nm and 2 μm. In other examples, however, the thickness of one or more sublayers 1728 may exceed 20 μm or be smaller than 200 nm. The sublayers 1728 in a given assembly 1700 need not have identical thicknesses. In general, the greater the thickness of a sublayer 1728, the greater the voltage required to drive the sublayer 1728 (i.e. to change the absorption characteristics of the sublayer 1728).

The polymer sublayers 1724 cause voltage drops across their thicknesses, and are therefore limited in thickness; however, each polymer sublayer 1724 is also of sufficient thickness to be substantially nonporous and resistant to mechanical stresses imposed during manufacture and use of the assembly 1700. In some examples, each polymer sublayer 1724 has a thickness of between about 50 nm and about 5 μm. In further examples, each polymer sublayer 1724 preferably has a thickness of between about 200 nm and about 1 μm.

Figure 18:
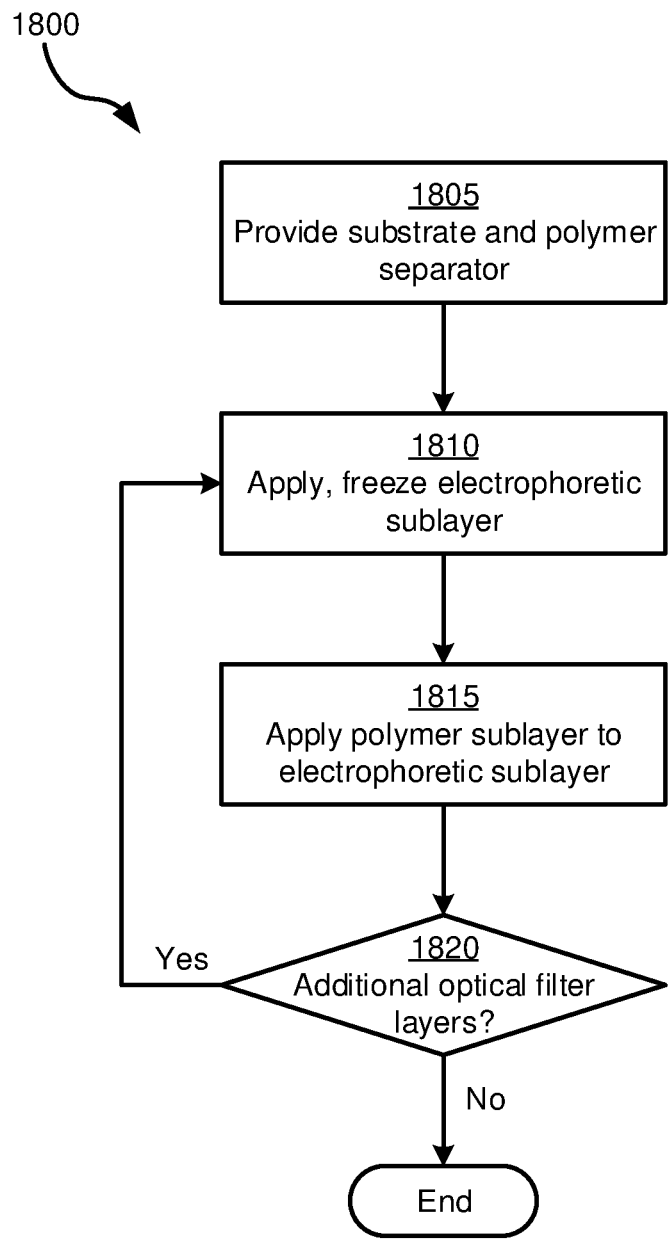
FIG. 18 depicts a method of fabricating the display assembly of FIG. 17, according to a non-limiting embodiment.
Figure 19A:
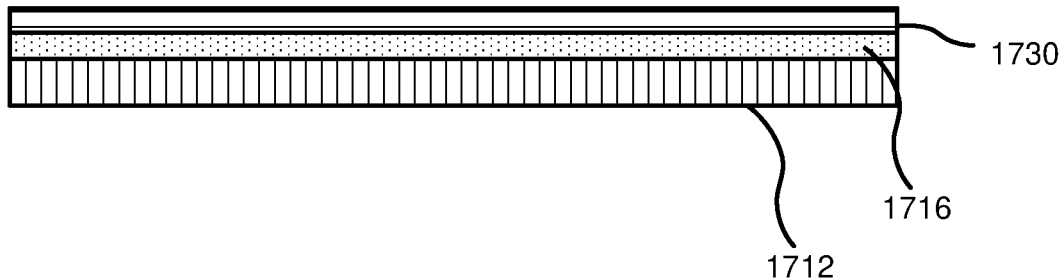
FIG. 19A-19B depict the results of blocks 1805 and 1810 of the method of FIG. 18, according to a non-limiting embodiment.

Various methods of fabricating the assembly 1700 are contemplated. Turning to FIG. 18, a method 1800 of fabricating a display such as assembly 1700 is illustrated. The performance of method 1800 begins at block 1805, at which a substrate and dielectric polymer separator are provided, as shown in FIG. 19A. The substrate can be either the substrate layer 1704 or the substrate layer 1712 shown in FIG. 17. As a result, the polymer sublayer provided at block 1805 includes either the sublayer 1724-1 or the sublayer 1730. As will be apparent, the materials provided at block 1805 typically also include one of the electrodes 1708 and 1716, between the substrate and the polymer sublayer. The substrate and polymer sublayer provided at block 1805, as well as any electrode layer, may be fabricated according to any suitable techniques apparent to those skilled in the art. The fabrication techniques described herein may also be employed at block 1805.

Figure 19B:
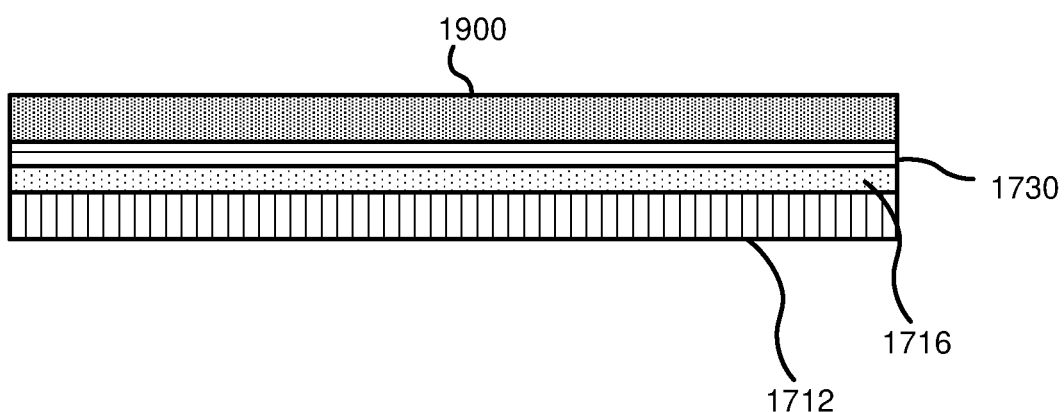

At block 1810, an electrophoretic sublayer 1728 is applied over the polymer sublayer provided at block 1805. The electrophoretic sublayer 1728 is applied as a fluid carrying the above-mentioned charged particles in suspension. Any suitable process for applying the fluid to the polymer sublayer may be employed. For example, the fluid may be applied as a film by spin coating, or by spreading with a mayer rod or doctor blade, or may be pressed between two fixed flat surfaces which are spaced according to the desired thickness of the layer. Following application of the electrophoretic fluid, the fluid is frozen. FIG. 19B depicts the assembly with a frozen electrophoretic sublayer 1900 thereon.

At block 1815, a polymer sublayer is applied on the frozen electrophoretic sublayer applied at block 1810. Various mechanisms for forming the polymer sublayer are contemplated, examples of which will be discussed below in greater detail. Once the polymer sublayer is applied at block 1815, a determination is made at block 1820 as to whether to fabricate additional optical filter layers 1720. For example, any given fabrication of a assembly 1700 typically has a number of layers 1720 specified in advance, and thus the determination at block 1820 is a determination of whether that number has been reached. When the determination at block 1820 is affirmative, blocks 1810 and 1815 are repeated. When the determination at block 1820 is negative, the performance of method 1800 ends. As will be apparent, additional steps may be performed before the assembly 1700 is complete. For example, following a negative determination at block 1820, the opposite substrate and electrode may be applied to the layered structure prepared through one or more performances of blocks 1810-1815.

Figure 20:
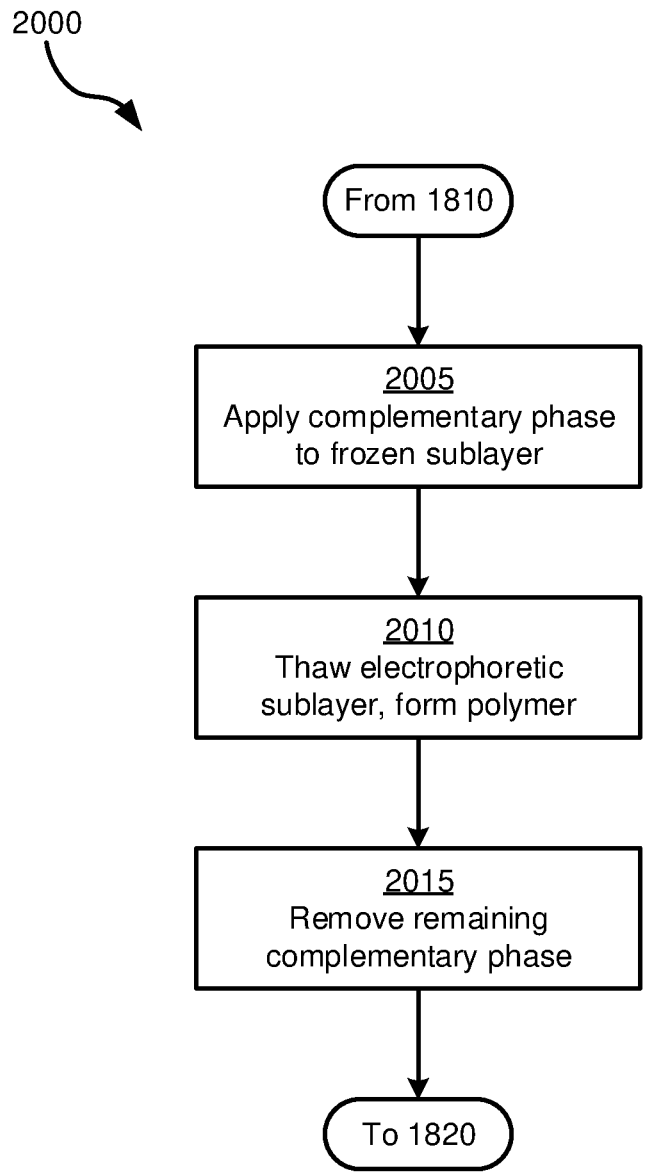
FIG. 20 depicts a method for performing block 1815 of the method of FIG. 18, according to a non-limiting embodiment.
Figure 21A:
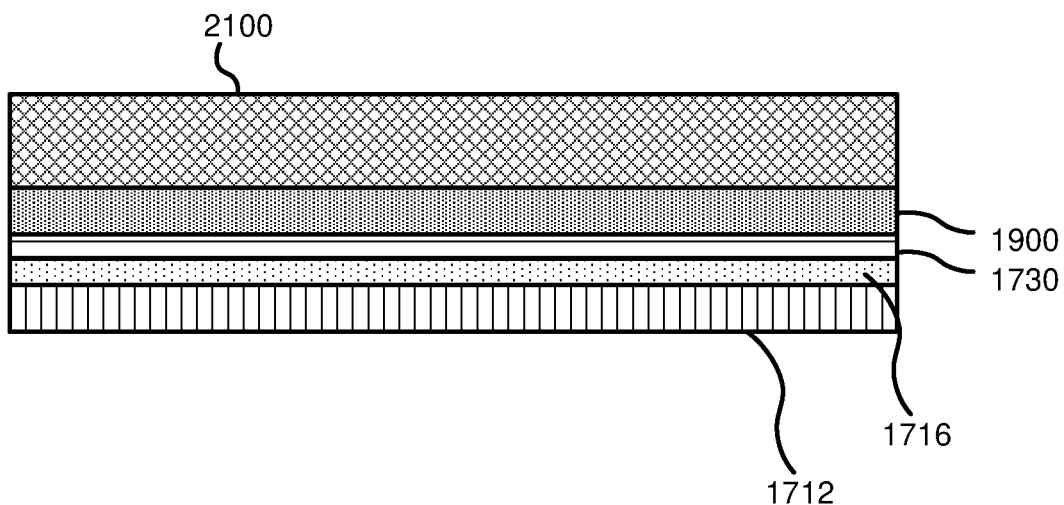
FIGS. 21A-21C depict cross-sections of the fabrication of a display assembly according to the method of FIG. 20, according to a non-limiting embodiment.

As noted earlier, various mechanisms are contemplated for forming polymer sublayers over fluid electrophoretic sublayers. Referring to FIG. 20, a method 2000 of performing block 1815 is illustrated. In particular, the method 2000 provides a polymer sublayer fabrication technique based on interfacial polymerization. At block 2005, a complementary fluid phase 2100 (see FIG. 21A) is applied over the frozen electrophoretic sublayer 1900. In this fabrication technique, the optically active components are suspended in either of a polar phase and a nonpolar (e.g. oil) phase. The complementary fluid phase 2100 is the other of the polar phase and the nonpolar phase.

In the present example, the electrophoretic sublayer 1900 is the nonpolar phase, and the complementary phase 2100 is therefore the polar phase. The nonpolar phase, in the present example, includes a nonpolar solvent or a mixture of nonpolar solvents. Preferably, the nonpolar solvent has a melting point that is below ambient temperature (e.g. below about 15 degrees Celsius), but greater than about −40 degrees Celsius. Example nonpolar materials include benzene, carbon tetrachloride, para-xylene, and cyclohexane. Preferably, the nonpolar material forming the electrophoretic sublayer 1900 includes one or both of para-xylene and cyclohexane. The nonpolar material preferably does not sublimate from the solid phase at atmospheric pressure. Further, the nonpolar phase is substantially immiscible in the polar phase.

The nonpolar phase may also include, in some embodiments, a cosolvent (representing up to 40% by mass of the nonpolar phase) that is miscible with both phases, such as 1,4-dioxane, dimethyl sulfoxide, or ethylene glycol. The cosolvent freezes at a temperature close to that of the nonpolar phase.

The polar phase forming the complementary sublayer 2100 includes a polar solvent or a mixture of polar solvents, which is substantially immiscible with the nonpolar phase. The freezing point of the polar phase is lower than that of the nonpolar phase, and the polar phase has a nonzero vapor pressure at temperatures between its freezing point and the above-mentioned melting point of the nonpolar phase. Examples of polar materials for use in the polar phase include one or more of acetonitrile, water, and methanol.

Figure 22:
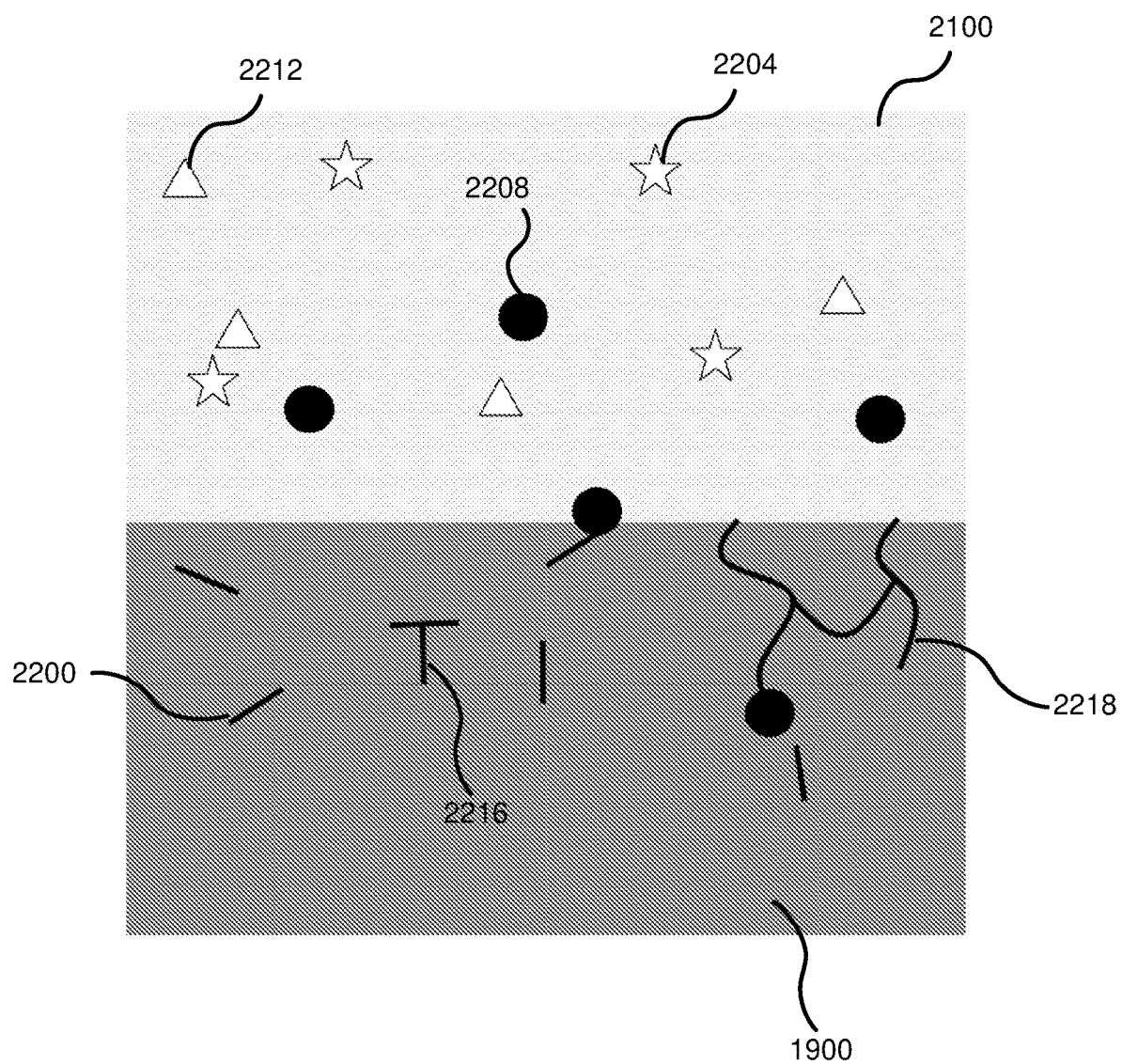
FIG. 22 depicts certain components employed in the method of FIG. 20, according to a non-limiting embodiment.

Turning to FIG. 22, a schematic illustration of the components employed in interfacial polymerization is shown. In the present example, the electrophoretic sublayer 1900 includes a plurality of monomers 2200, which when crosslinked will form a polymer sublayer as mentioned above. The monomers may be, for example, styrene or methyl methacrylate. Any other oil-soluble monomers may also be employed. In other embodiments, the monomers may be water-soluble rather than oil-soluble, and may therefore be dissolved in the complementary phase 2100 instead of the electrophoretic sublayer 1900. When the monomers are not soluble in the phase carrying the electrophoretic components (the nonpolar phase, in this example), the glass transition temperature of the monomers is preferably below about 10 degrees. The electrophoretic sublayer 1900 (also referred to as the carrier phase, as it carries the electrophoretic components) preferably wets the resulting polymer, to ease the application of additional layers of carrier phase (i.e. a further performance of block 1810 of the method 1800).

In addition, the complementary (in this example, polar) fluid phase 2100 applied over the frozen electrophoretic sublayer 1900 (in this case, nonpolar) includes an initiator compound 2204. The initiator 2204, more generally, is a compound dissolved in the phase that does not carry the monomers to be polymerized. In the present example, since the monomers 2200 are in the nonpolar phase, the initiators 2204 are in the polar phase. The initiator 2204 forms radical species which participate in polymer chain formation. In the present example, the initiator 2204 is an oxidizing agent, such as hydrogen peroxide, which forms free radicals 2208, such as hydroxide radicals. The initiator can also be, in other examples, a photoinitiator which produces radicals upon exposure to certain wavelengths of light (e.g. ultraviolet). In further examples, the initiator can be a thermal initiator, which produces radicals above a certain temperature (preferably a relatively low temperature, e.g. between 0 and 20 degrees Celsius). When components of the electrophoretic nanoparticles are readily oxidized, the initiators 2200 are preferably not placed in the carrier phase, to avoid undesirable modification of the nanoparticles by the initiators 2200.

When the initiators 2200 are oxidizing agents as in the illustrated example, the complementary fluid phase 2100 (or more generally, the phase carrying the initiators 2200) can also optionally include a reducing agent 2212. The reducing agent increases the rate at which the initiator 2200 produces radicals 2208. Examples of optional reducing agents 2212 include tetraethylpentamine (TEPA) and water soluble amines; other suitable reducing agents will also occur to those skilled in the art.

Further, the phase carrying the monomers 2200 (the nonpolar, carrier phase in the present example) may also include a crosslinking compound 2216, for enabling the formation of polymer chains from the monomers 2200. Example crosslinkers include divinyl benzene, or other monomers with 2 double bonds. As seen in the right-hand portion of the electrophoretic fluid 1900 in FIG. 22, polymer chain formation is initiated by interactions between radicals 2208 and monomers 2200 at the interface between phases 1900 and 2100. A polymer chain 2218 is formed by the connection of a plurality of monomers and crosslinkers 2218, and the radical 2208 that initiated the chain advances along the chain as monomers are added thereto.

Figure 21B:
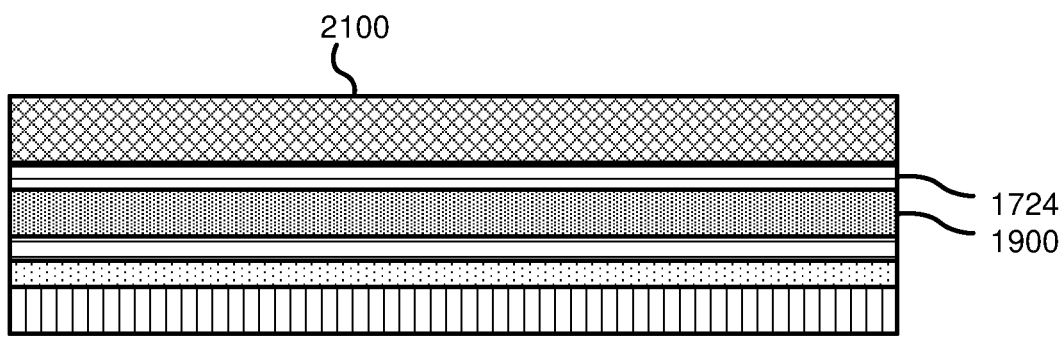
Figure 21C:
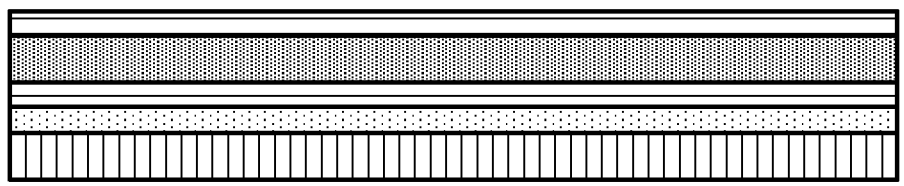

The construction of the polymer sublayer proceeds by applying the complementary phase (e.g. as a film, or by immersing the assembly shown in FIG. 19B in the complementary phase), and at block 2010, allowing the frozen electrophoretic layer 1900 to thaw slowly. As the electrophoretic layer 1900 thaws, a polymer sublayer 1724 is formed at the interface between the electrophoretic layer 1900 and the complementary fluid phase 2100, as shown in FIG. 21B. The excess complementary fluid is then removed, at block 2015 as shown in FIG. 21C.

In other embodiments, the interfacial polymerization may proceed via addition polymerization as well, for example using a water-soluble amine and an oil-soluble acyl chloride. However, it is preferable for the fabrication of polymer sublayers to avoid the creation of excess acids or bases, as this could introduce undesirable levels of free ions into the layers 1720, which would increase the voltage requirements of the assembly 1700.

As noted above, the arrangement of the phases as discussed above may also be reversed. That is, the polar phase can also be the carrier phase, while the complementary phase can be nonpolar. Material selections require adjustment in such embodiments. As also noted above, in other embodiments hydrophilic monomers and hydrophobic initiators may be employed.

Figure 23:
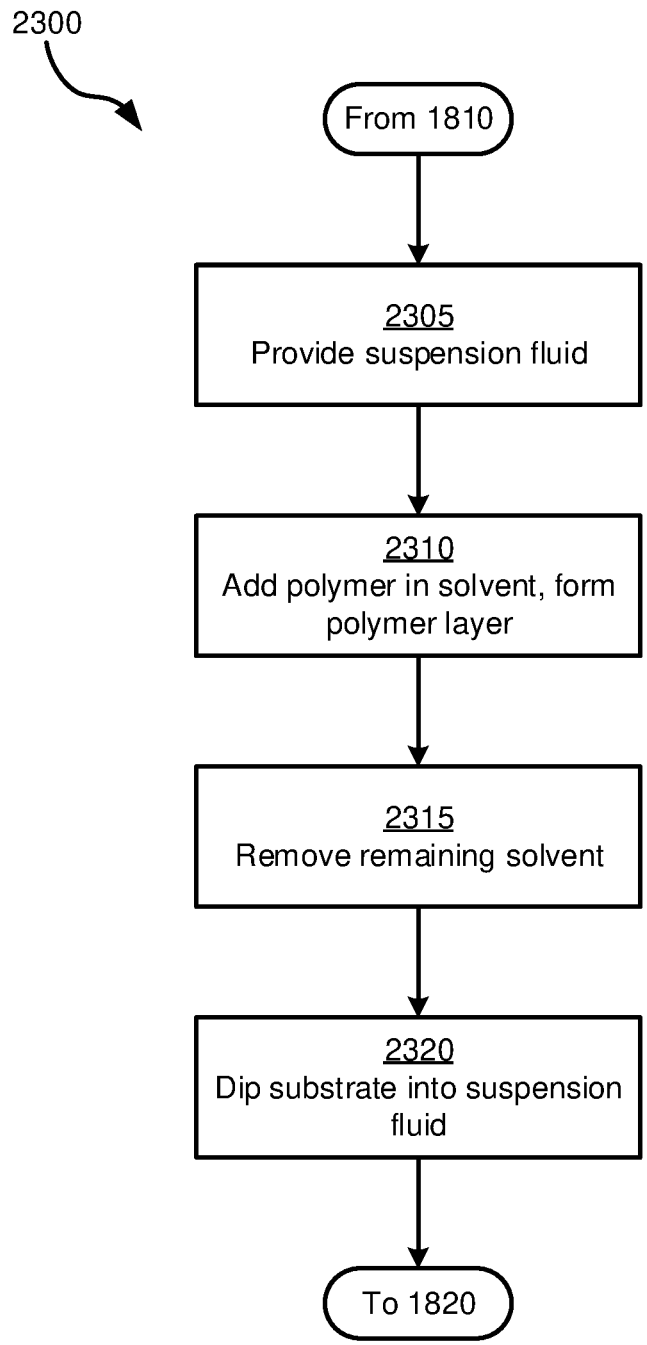
FIG. 23 depicts a method for performing block 1815 of the method of FIG. 18, according to another non-limiting embodiment.
Figure 24A:
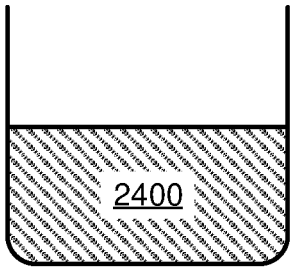
FIGS. 24A-24F depict cross-sections of the fabrication of a display assembly according to the method of FIG. 23, according to a non-limiting embodiment.
Figure 24B:
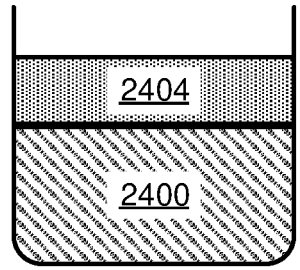
Figure 24C:
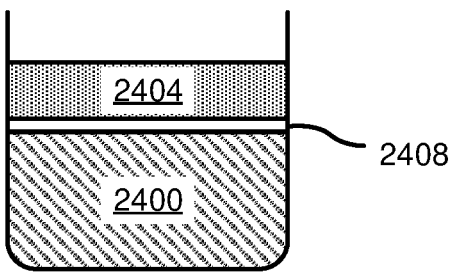

Turning to FIG. 23, a further method 2300 for performing block 1815 is illustrated, based on an immersion transfer technique. At block 2305, a suspension fluid 2400 is provided (see FIG. 24A). At block 2310, a fluid layer of solvent 2404 (see FIG. 24B) containing the polymer (preferably cross-linked so as to increase its robustness) is applied to the suspension fluid 2400. The layers 2400 and 2404 are substantially immiscible. When the layer 2404 is applied, a polymer sublayer 2408 is formed (see FIG. 24C). The polymer sublayer 2408 may be formed by interface polymerization as discussed above. In other embodiments, the polymer sublayer 2408 may be formed by polymerizing in a thin layer of the solvent 2404 in which the polymer is soluble but which is not miscible in the suspension phase 2400.

Figure 24D:
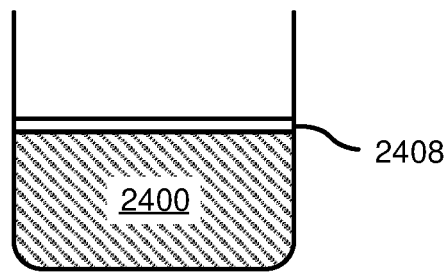

At block 2315, the remaining solvent 2404 is removed, for example by evaporation (see FIG. 24D). The evaporation is preferably performed slowly to minimize stresses in the polymer film 2408. Further, the suspension fluid 2400 can include a solvent which swells the polymer 2408 so that the stresses in the polymer are minimized as it dries.

Figure 24E:
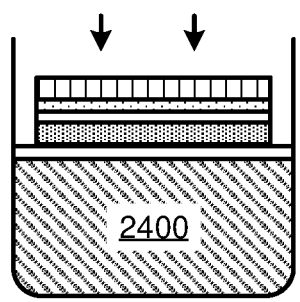
Figure 24F:
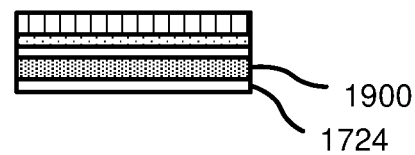

At block 2320, the substrate, carrying the frozen electrophoretic layer 1900 as shown in FIG. 19B, is immersed (e.g. by dipping) into the receptacle containing the suspension fluid 2400, to bring the frozen electrophoretic layer 1900 into contact with the polymer 2408 (see FIG. 24E). As a result, as seen in FIG. 24F, the electrophoretic sublayer 1900 carries a polymer sublayer 1724. The suspension fluid 2400 preferably has a freezing point lower than that of the electrophoretic sublayer 1900, and most preferably at least 10 degrees below that of the electrophoretic sublayer 1900. When the immersion process is performed, the suspension fluid 2400 is preferably at a temperature above its freezing point but below the freezing point of the electrophoretic sublayer 1900, to prevent the electrophoretic sublayer 1900 from melting or evaporating during the immersion transfer. Further, the suspension fluid 2400 is preferably immiscible with the fluid used in the electrophoretic sublayer 1900, so that freezing point depression does not occur to decrease the melting temperature of the electrophoretic sublayer 1900.

Figure 25:
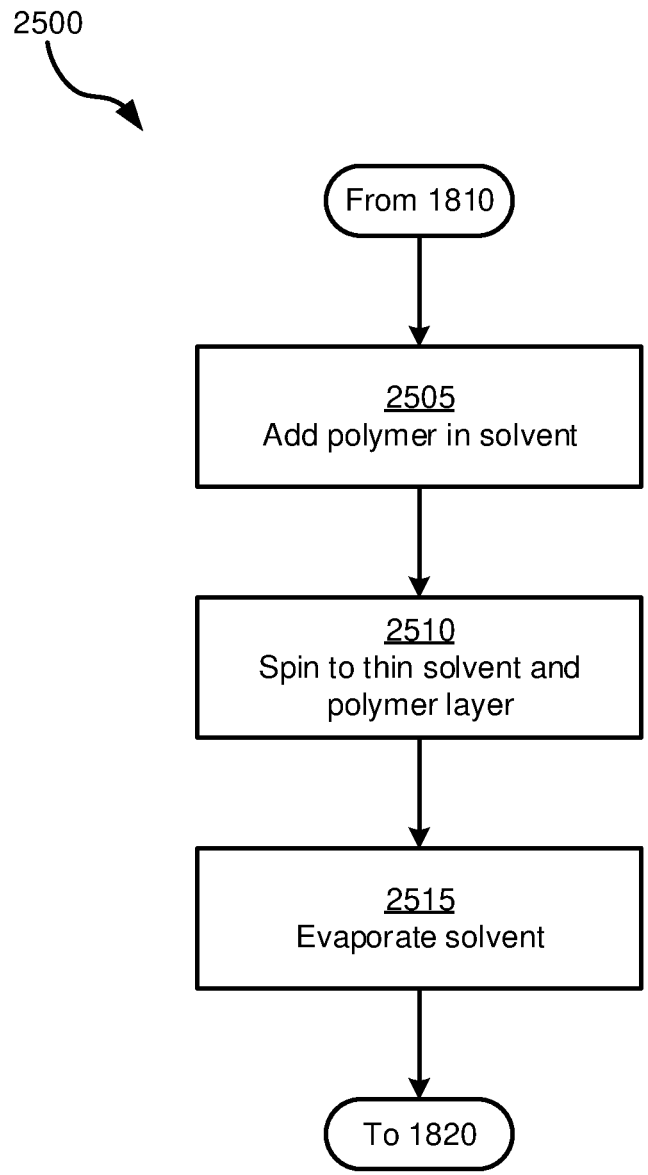
FIG. 25 depicts a method for performing block 1815 of the method of FIG. 18, according to a further non-limiting embodiment.
Figure 26A:
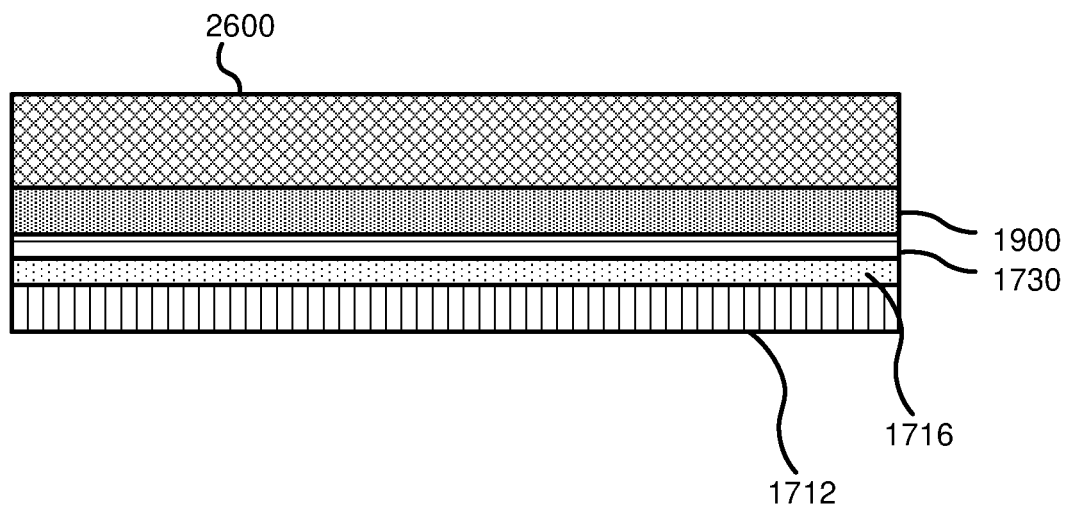
FIGS. 26A-26C depict cross-sections of the fabrication of a display assembly according to the method of FIG. 25, according to a non-limiting embodiment.

Turning to FIG. 25, a further method 2500 is illustrated for performing block 1815 of the method 1800, based on a spin coating technique. At block 2505, a layer of dissolved polymer 2600 (see FIG. 26A) is applied over the frozen electrophoretic sublayer 1900. The solvent in the dissolved polymer layer 2600 preferably has a temperature below the freezing point of the sublayer 1900. Preferably, the solvent is substantially immiscible with the carrier material of the sublayer 1900, to reduce or prevent freezing point depression in the sublayer 1900.

Figure 26B:
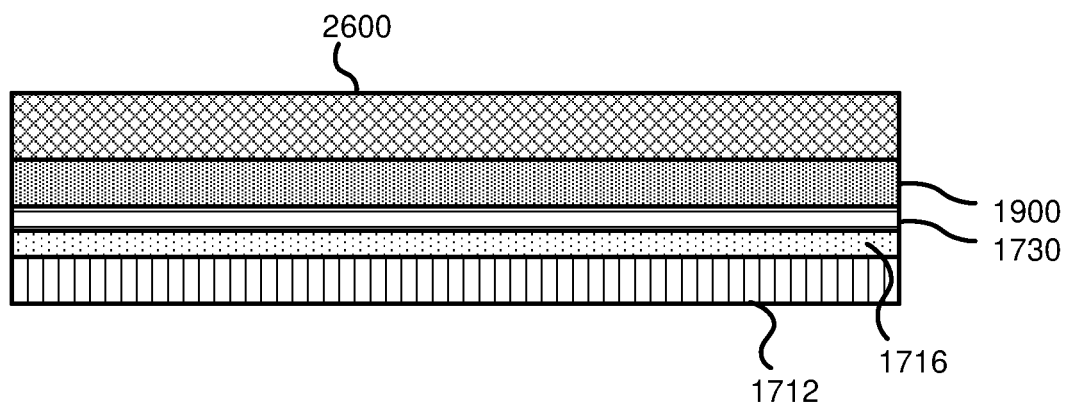
Figure 26C:
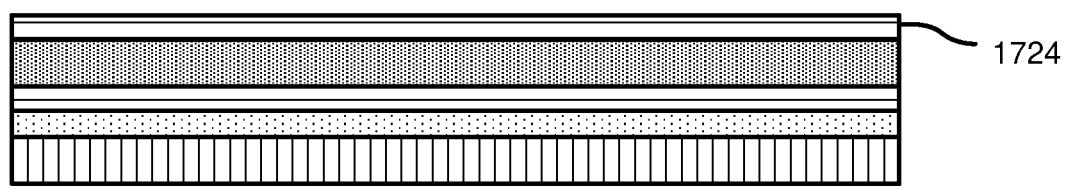

At block 2510, the layer 2600 is thinned by spinning (see FIG. 26B). At block 2515, the solvent in layer 2600 is evaporated to dry the polymer out of the solvent, leaving a polymer sublayer 1724 (see FIG. 26C). In some embodiments, the polymer may be crosslinked before drying. The polymer may also be insoluble in the electrophoretic sublayer 1900.

The scope of the claims should not be limited by the embodiments set forth in the above examples, but should be given the broadest interpretation consistent with the description as a whole.

The invention claimed is:

1. A display assembly comprising:
   an outer substrate;
   an inner substrate;
   a first substantially planar electrode and a second substantially planar electrode disposed between the inner substrate and the outer substrate in a spaced apart relationship;
   a first substantially planar microstructure extending parallel to the first and second substantially planar electrodes, proximal the first electrode, the first microstructure containing an electrophoretic media; and
   at least one further substantially planar microstructure extending parallel to the first and second substantially planar electrodes and the first substantially planar microstructure, between the first microstructure and the second electrode, the further microstructure containing a further electrophoretic media.

2. The display assembly of claim 1, further comprising a plurality of substantially planar further microstructures between the first microstructure and second electrode.

3. The display assembly of claim 2, further comprising a plurality of dividers disposed between adjacent microstructures.

4. The display assembly of claim 1, wherein the first and second electrodes extend from the inner substrate to the outer substrate.

5. The display assembly of claim 4, wherein the microstructure and the at least one further microstructure are channels divided by channel walls and wherein the electrophoretic media and the further electrophoretic media are an electrophoretic fluid contained by the channel walls.

6. The display assembly of claim 1, wherein the first electrode is adjacent to the inner substrate and the second electrode is adjacent to the outer substrate.

7. The display assembly of claim 6, wherein the microstructure and the at least one further microstructure are electrophoretic sublayers.

8. The display assembly of claim 6, wherein the second electrode is transparent.

9. The display assembly of claim 1, further comprising at least one further driven electrode and at least one further reference electrode in a spaced apart relationship.

10. The display assembly of claim 9, wherein the at least one further driven electrode, the at least one further reference electrode, the first electrode and the second electrode are interdigitated.

11. A method of fabricating a display assembly, the method comprising:
   providing a substrate layer;

applying a layer of preliminary material to the substrate layer;
applying a mask material to the preliminary material;
etching trenches in the preliminary material;
applying a conformal coat of dielectric material;
etching channels in the conformal coat; and
filling the channels with an electrophoretic fluid.

12. The method of claim 11, wherein applying the mask material comprises;
applying an electrode mask material to the preliminary material where a first electrode and a second electrode are to be placed; and
applying a channel mask material to the preliminary material over locations of every second channel of the channels.

13. The method of claim 12, further comprising, prior to applying the conformal coat, removing the channel mask material.

14. The method of claim 13, wherein etching channels into the conformal coat comprises:
etching a top portion of the conformal coat to expose a portion of the preliminary material; and
etching the exposed preliminary material to form the channels.

15. The method of claim 11, wherein applying the mask material comprises:
applying a channel mask material to the preliminary material over locations of every second channel of the channels.

16. The method of claim 15, wherein etching channels into the conformal coat comprises:
etching a top portion of the conformal coat to expose a portion of the preliminary material;
applying an electrode mask material to form a protective layer of top of the channel mask material where a first electrode and a second electrode are to be placed;
removing the channel mask material to expose a portion of the preliminary material; and
etching the exposed preliminary material to form the channels.

17. The method of claim 11, further comprising applying an opposing substrate over the channels.

18. A method of fabricating a display assembly, the method comprising:
providing a substrate layer;
applying a layer of preliminary material to the substrate layer;
applying a mask material to the preliminary material;
etching at least one channel in the preliminary material;
applying a first electrode and a second electrode extending from the substrate in a spaced-apart relationship; and
filling the at least one channel with an electrophoretic fluid.

19. The method of claim 18, wherein the preliminary material comprises a silicon-based material.

20. The method of claim 19, wherein the mask material is applied over locations of walls dividing the channels, and wherein outer walls have a greater width than inner walls.

21. The method of claim 20, wherein applying the first and second electrodes comprises:
removing the mask material;
oxidizing the preliminary material to form the walls; and
wherein the outer walls are partially oxidized, such that the preliminary material forms a conductive core of the outer walls, thereby forming the first and second electrodes.

22. The method of claim 18, wherein the preliminary material comprises a polymeric material.

23. The method of claim 22, wherein applying the first and second electrodes comprises:
depositing a conductive material onto one side of each wall forming the at least one channel;
applying caps over electrode channels where the first and second electrodes are to be placed, including over the conductive material in the electrode channels; and
removing the mask material and the conductive material via application of a solvent, wherein the caps leave the conductive material in the electrode channels untouched by the solvent, thereby forming the first and second electrodes.

24. A method of fabricating a display assembly, comprising:
providing a substrate having an initial polymer sublayer on a surface thereof;
applying a frozen electrophoretic sublayer onto the initial polymer sublayer; and
applying a polymer sublayer on the electrophoretic sublayer.

25. The method of claim 24, the substrate further including a first electrode between the substrate and the initial polymer sublayer; the method further comprising:
applying a second electrode and a second substrate on the polymer sublayer.

26. The method of claim 24, further comprising:
repeating the application of a frozen electrophoretic sublayer and the application of a polymer sublayer.

27. The method of claim 24, wherein applying the polymer sublayer comprises applying the polymer sublayer by interfacial polymerization.

28. The method of claim 24, wherein applying the polymer sublayer comprises applying the polymer sublayer by immersion transfer.

29. The method of claim 24, wherein applying the polymer sublayer comprises applying the polymer sublayer by spin coating.

30. A display device comprising:
a plurality of display assemblies, each display assembly comprising:
an outer substrate;
an inner substrate;
a first substantially planar electrode and a second substantially planar electrode disposed between the inner substrate and the outer substrate in a spaced apart relationship;
a first substantially planar microstructure extending parallel to the first and second substantially planar electrodes, proximal the first electrode, the first microstructure containing an electrophoretic media; and
at least one further substantially planar microstructure extending parallel to the first and second substantially planar electrodes and the first substantially planar microstructure, between the first microstructure and the second electrode, the further microstructure containing a further electrophoretic media;
wherein each display assembly represents a pixel of the display device.

31. The display device of claim 30, wherein the plurality of display assemblies is arranged in a rectangular array.

* * * * *